US012647272B2

(12) United States Patent
Johnson

(10) Patent No.: US 12,647,272 B2
(45) **Date of Patent: *Jun. 2, 2026**

(54) NESTED BLOCKCHAIN SYSTEM

(71) Applicant: Walmart Apollo, LLC, Bentonville, AR (US)

(72) Inventor: Christopher M. Johnson, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/629,283

(22) Filed: Apr. 8, 2024

(65) Prior Publication Data

US 2024/0259209 A1     Aug. 1, 2024

Related U.S. Application Data

(63) Continuation of application No. 17/840,738, filed on Jun. 15, 2022, now Pat. No. 11,985,248, which is a
(Continued)

(51) Int. Cl.
*H04L 9/32* (2006.01)
*G06F 16/27* (2019.01)
(Continued)

(52) U.S. Cl.
CPC ............ *H04L 9/3236* (2013.01); *G06F 16/27* (2019.01); *H04L 9/321* (2013.01); *H04L 9/3247* (2013.01);
(Continued)

(58) Field of Classification Search
CPC ..... H04L 9/3236; H04L 9/321; H04L 9/3247; G06F 16/27
See application file for complete search history.

(56) References Cited

U.S. PATENT DOCUMENTS 5,875,435 A     2/1999  Brown
9,569,771 B2    2/2017  Lesavich
(Continued)

FOREIGN PATENT DOCUMENTS

CN     107145521 A     9/2017
CN     107195075 A     9/2017
(Continued)

OTHER PUBLICATIONS

Lee et al., Modifiable Public Blockchains using Truncated Hashing and Sidechains, IEEEAccess, 2016, pp. 1-12 (Year: 2016).*
(Continued)

*Primary Examiner* — Oleg Korsak
(74) *Attorney, Agent, or Firm* — Fitch, Even, Tabin & Flannery LLP

(57) ABSTRACT
Described in detail herein is a nested blockchain system. The nested blockchain system can include distributed nodes in a network. A node is configured to generate a master cryptographically verifiable distributed ledger represented by a sequence of blocks. The node spawns a first sub cryptographically verifiable ledger represented by a first genesis block containing a hash value referencing the first block generated in the master cryptographically verifiable ledger, in response to a first event. The node purges the first sub cryptographically verifiable ledger, in response to a second event.

20 Claims, 22 Drawing Sheets

Related U.S. Application Data continuation of application No. 16/422,140, filed on May 24, 2019, now abandoned.

(60) Provisional application No. 62/676,077, filed on May 24, 2018.

(51) Int. Cl.
  *G06Q 20/38*      (2012.01)
  *H04L 9/00*       (2022.01)

(52) U.S. Cl.
  CPC .............. *G06Q 20/389* (2013.01); *H04L 9/50* (2022.05); *H04L 2209/56* (2013.01)

(56) References Cited

U.S. PATENT DOCUMENTS

| | | | |
|---|---|---|---|
| 9,608,829 | B2 | 3/2017 | Spanos |
| 9,774,578 | B1 | 9/2017 | Ateniese |
| 10,261,711 | B1 | 4/2019 | Pasirstein |
| 10,296,764 | B1 | 5/2019 | Batishchev |
| 10,298,585 | B1 | 5/2019 | Treat |
| 10,534,913 | B2 | 1/2020 | Daniel |
| 10,701,054 | B2 | 6/2020 | Padmanabhan |
| 10,747,201 | B2 | 8/2020 | Biernat |
| 10,755,327 | B2 | 8/2020 | Nagla |
| 11,023,458 | B2 | 6/2021 | Quick |
| 11,184,171 | B2 | 11/2021 | Johnson |
| 11,431,564 | B1 | 8/2022 | Babu |
| 11,985,248 | B2 * | 5/2024 | Johnson ................ H04L 9/3297 |
| 2007/0088615 | A1 | 4/2007 | Meng |
| 2007/0239569 | A1 | 10/2007 | Lucas |
| 2010/0138037 | A1 | 6/2010 | Adelberg |
| 2014/0143099 | A1 | 5/2014 | Wilkins |
| 2014/0379536 | A1 | 12/2014 | Varma et al. |
| 2015/0170112 | A1 | 6/2015 | Decastro |
| 2015/0269570 | A1 | 9/2015 | Phan |
| 2016/0292672 | A1 | 10/2016 | Fay |
| 2016/0323109 | A1 | 11/2016 | Mccoy |
| 2016/0330034 | A1 | 11/2016 | Back |
| 2016/0364681 | A1 | 12/2016 | Andrus |
| 2017/0011460 | A1 | 1/2017 | Molinari |
| 2017/0046651 | A1 | 2/2017 | Lin |
| 2017/0046664 | A1 | 2/2017 | Haldenby |
| 2017/0046694 | A1 | 2/2017 | Chow |
| 2017/0046792 | A1 | 2/2017 | Haldenby |
| 2017/0046806 | A1 | 2/2017 | Haldenby |
| 2017/0048216 | A1 | 2/2017 | Chow |
| 2017/0048235 | A1 | 2/2017 | Lohe |
| 2017/0053249 | A1 | 2/2017 | Tunnell |
| 2017/0103167 | A1 | 4/2017 | Shah |
| 2017/0103468 | A1 | 4/2017 | Orsini |
| 2017/0177656 | A1 | 6/2017 | Johnson |
| 2017/0214699 | A1 | 7/2017 | Johnsrud |
| 2017/0236104 | A1 | 8/2017 | Biton |
| 2017/0243025 | A1 | 8/2017 | Kurian |
| 2017/0243193 | A1 | 8/2017 | Manian |
| 2017/0366353 | A1 | 12/2017 | Struttmann |
| 2018/0009634 | A1 | 1/2018 | Guilani |
| 2018/0012311 | A1 | 1/2018 | Small |
| 2018/0025435 | A1 | 1/2018 | Karame |
| 2018/0046766 | A1 | 2/2018 | Deonarine |
| 2018/0062831 | A1 | 3/2018 | Zhang |
| 2018/0096175 | A1 | 4/2018 | Schmeling |
| 2018/0096347 | A1 | 4/2018 | Goeringer |
| 2018/0096360 | A1 | 4/2018 | Christidis |
| 2018/0254841 | A1 | 9/2018 | Nannra |
| 2018/0276625 | A1 | 9/2018 | Saye |
| 2018/0337781 | A1 | 11/2018 | Frankel |
| 2019/0026685 | A1 | 1/2019 | Chappell |
| 2019/0114584 | A1 | 4/2019 | Toohey |
| 2019/0188700 | A1 | 6/2019 | August |
| 2019/0188711 | A1 | 6/2019 | Wu |
| 2019/0236559 | A1 | 8/2019 | Padmanabhan |
| 2019/0251199 | A1 | 8/2019 | Klianev |
| 2019/0279210 | A1 | 9/2019 | Pen |
| 2019/0340266 | A1 | 11/2019 | Vo |
| 2019/0340267 | A1 | 11/2019 | Vo |
| 2019/0362305 | A1 | 11/2019 | Johnson |
| 2019/0363884 | A1 | 11/2019 | Johnson |
| 2019/0363890 | A1 | 11/2019 | Johnson |
| 2020/0145194 | A1 | 5/2020 | Stollery |
| 2020/0394159 | A1 | 12/2020 | Hurley |
| 2020/0394176 | A1 | 12/2020 | Wu |
| 2020/0394177 | A1 | 12/2020 | Maurer |
| 2020/0396072 | A1 | 12/2020 | Maurer |
| 2021/0090076 | A1 | 3/2021 | Wright |
| 2021/0099313 | A1 | 4/2021 | Kondrashov |
| 2022/0311618 | A1 | 9/2022 | Johnson |

FOREIGN PATENT DOCUMENTS

| | | |
|---|---|---|
| WO | 201791530 A1 | 6/2017 |
| WO | 2019226986 | 11/2019 |

OTHER PUBLICATIONS

International Search Report and Written Opinion from related International Patent Application No. PCT/US2019/033912 issued Aug. 12, 2019.

International Search Report and Written Opinion from related International Patent Application No. PCT/US2019/033979 issued Aug. 12, 2019.

International Search Report and Written Opinion from related International Patent Application No. PCT/US2019/034013 issued Aug. 12, 2019.

Khanna, Editable Blockchain: First step towards exception management, https://medium.com/@digitalinsights/editable-blockchain-first-step-towards-exception-managemenl-fd6016ac7f9a, Oct. 13, 2017.

Parent & Child Architecture for Blockchain System, DLT labs, https://dltlabs.io/parent-child-architecture-for-blockchain-system/, 2017.

Poon, et al., Plasma: Scalable Autonomous Smart Contracts, https://plasma.io/, Working Draft, Aug. 11, 2017.

Roberts, Blockchain Banking: IBM and Steller are Launching Blockchain Banking Across Multiple Countries, Fortune.com, http://fortune.com/2017/10/16/ibm-blockchain-slellar/, Oct. 16, 2017.

Sargent, Blockchain's Future in the Language Industry, Common Sense Advisory, http://www.commonsenseadvisory.com/default.aspx?Contenttype=ArticleDetAD&tabID=63&Aid=47248&moduleId=390, Oct. 11, 2017.

Treat Editing the Uneditable Blockchain—Accenture, https://www.accenture.com/us-en/insight-ediling-unedilableblockchain, last viewed Feb. 4, 2018.

U.S. Appl. No. 16/422,130; Non-Final Rejection mailed Mar. 3, 2023 (pp. 1-14).

U.S. Appl. No. 16/422,136; Notice of Allowance Jul. 23, 2021; (pp. 1-5).

U.S. Appl. No. 16/422,136; Notice of Allowance mailed Apr. 12, 2021; (pp. 1-13).

U.S. Appl. No. 16/422,140; Notice of Allowance and Fees Due (PTOL-85) mailed Mar. 18, 2022; (pp. 1-7).

U.S. Appl. No. 16/422,140; Office Action mailed Jul. 6, 2021; (pp. 1-19).

U.S. Appl. No. 17/840,738; Non-Final Rejection mailed Sep. 19, 2023; (pp. 1-6).

U.S. Appl. No. 17/840,738; Notice of Allowance and Fees Due (PTOL-85) mailed Jan. 8, 2024; (pp. 1-8).

* cited by examiner

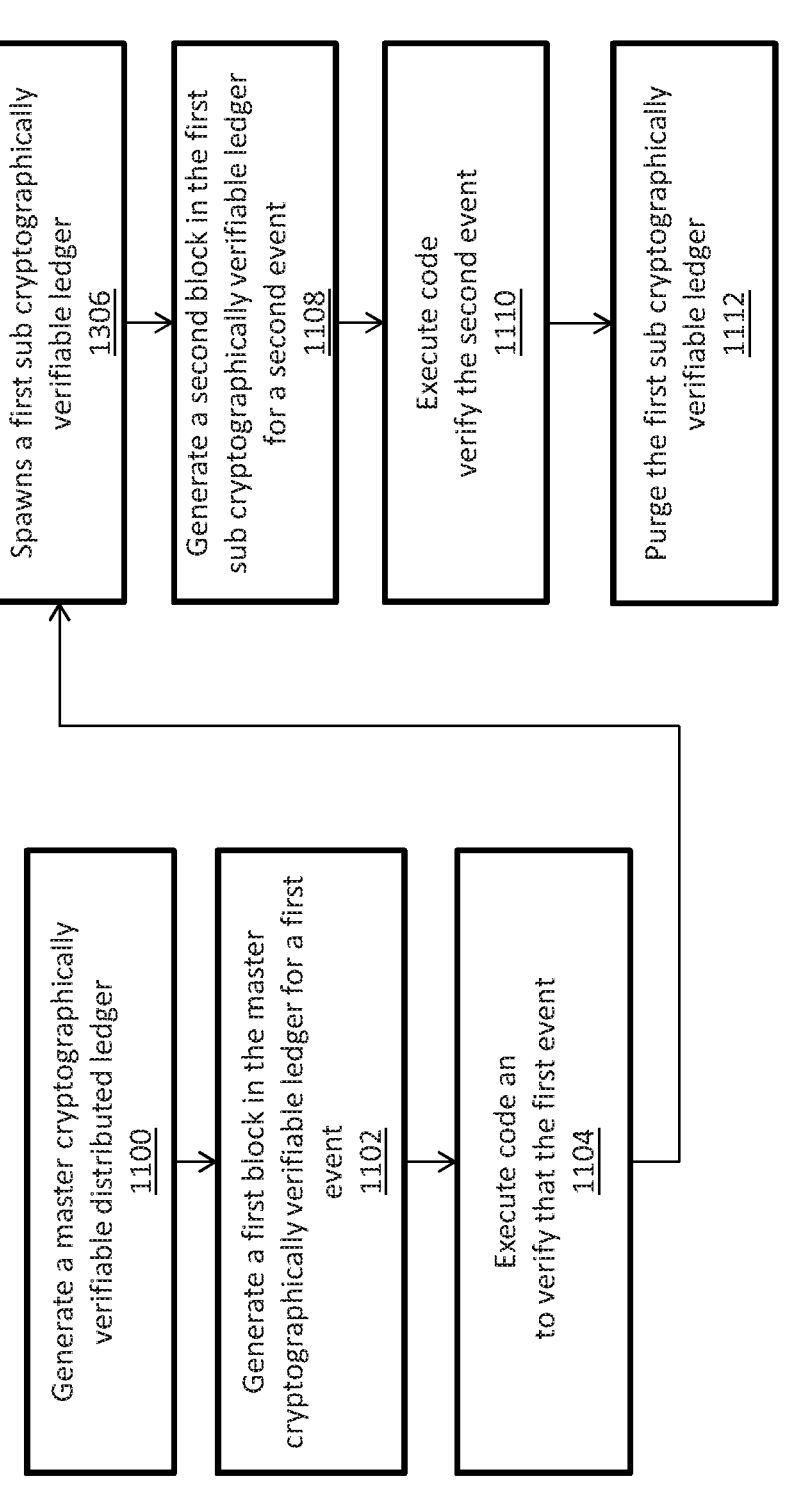

Generate a master cryptographically verifiable distributed ledger
1100

Generate a first block in the master cryptographically verifiable ledger for a first event
1102

Execute code an to verify that the first event
1104

Spawns a first sub cryptographically verifiable ledger
1306

Generate a second block in the first sub cryptographically verifiable ledger for a second event
1108

Execute code verify the second event
1110

Purge the first sub cryptographically verifiable ledger
1112

FIG. 11

NESTED BLOCKCHAIN SYSTEM

CROSS-REFERENCE TO RELATED APPLICATIONS

This application is a continuation application of U.S. application Ser. No. 17/840,738, filed Jun. 15, 2022, which is a continuation application of U.S. application Ser. No. 16/422,140, filed May 24, 2019, which claims priority to and the benefit of U.S. Provisional Application No. 62/676,077, filed on May 24, 2018, the contents of which are incorporated by reference herein in its entirety.

TECHNICAL FIELD

This invention relates generally to blockchain systems.

BACKGROUND

Large distributed systems can encounter multiple different types of data values. Storing the data without converting the data values can cause errors.

BRIEF DESCRIPTION OF DRAWINGS

Illustrative embodiments are shown by way of example in the accompanying figures and should not be considered as a limitation of the present disclosure. The accompanying figures, which are incorporated in and constitute a part of this specification, illustrate one or more embodiments of the invention and, together with the description, help to explain the invention. In the figures:

FIG. 11 is a flowchart illustrating the process of an exception handling system using blockchain controls.

DETAILED DESCRIPTION

Figure 1A:
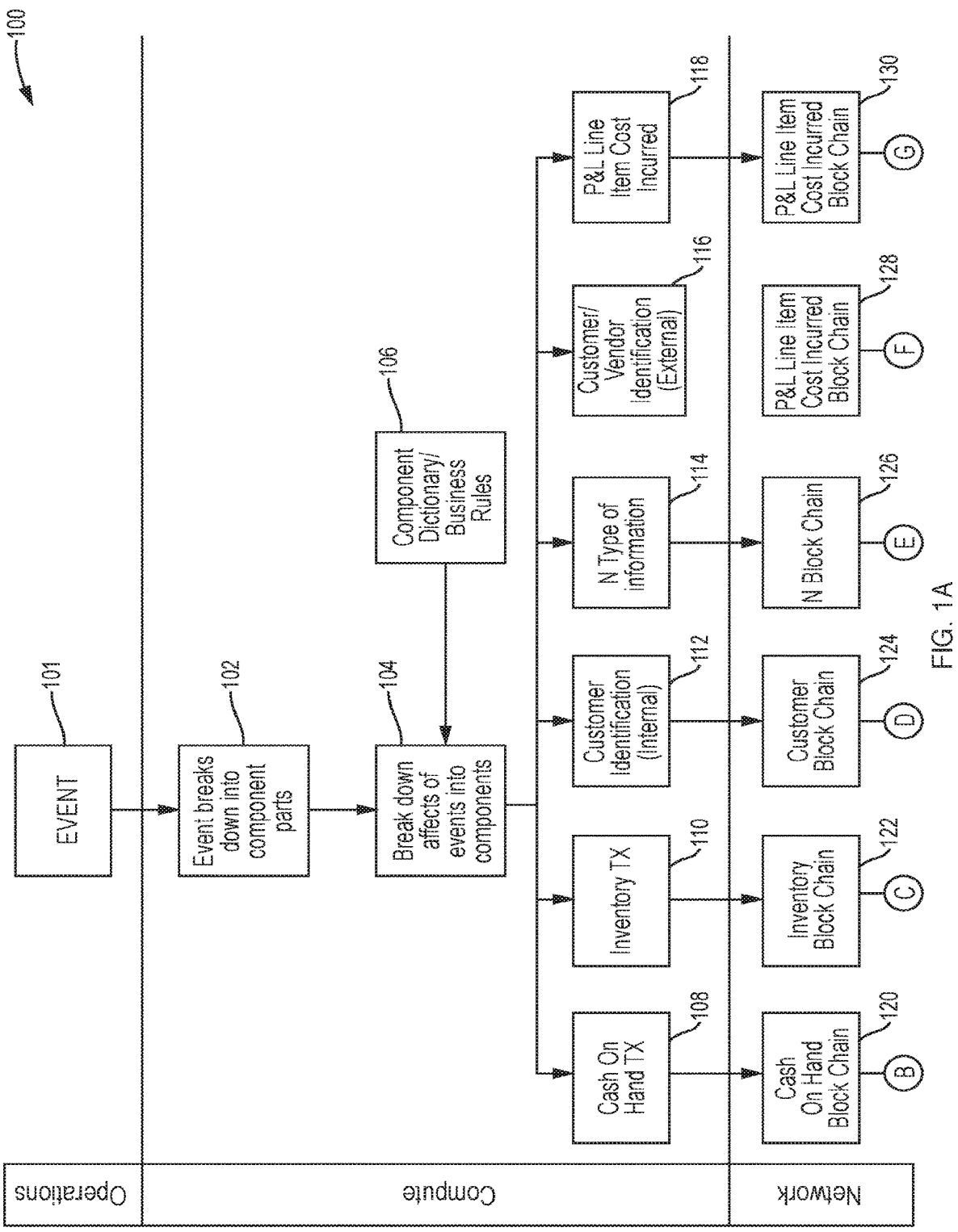
FIGS. 1A-1C are a block diagram illustrating components and multiple blockchains in accordance with an exemplary embodiment.

Described in detail herein is a nested blockchain system. The nested blockchain system can include distributed nodes in a network. A node is configured to generate a master cryptographically verifiable distributed ledger represented by a sequence of blocks. Each block contains one or more transactions records and each subsequent block containing a hash value associated with the previous block. The node generates a first block in the master cryptographically verifiable ledger for a first event in response to receipt of the first event from a third party system. The node executes code included in an associated block of the master cryptographically verifiable ledger to verify that the first event corresponds with a first set of one or more conditions. In response to verification of the first event, the node spawns a first sub cryptographically verifiable ledger represented by a first genesis block containing a hash value referencing the first block generated in the master cryptographically verifiable ledger. The node generates a second block in the first sub cryptographically verifiable ledger for a second event in response to receipt of a second event from the third party system. The node executes code included in the first genesis block to verify that the second event corresponds with a second set of one or more conditions. In response to the verification of the second event, the node purges the first sub cryptographically verifiable ledger.

The one or more of the nodes are programmed to receive a third event. The one or more of the nodes are programmed to generate a third block in the master cryptographically verifiable ledger containing transaction records of the third event, execute code included in the third block to verify the third event corresponds with a third set of one or more conditions, and in response to verification of the third event, spawn a second sub cryptographically verifiable ledger represented by a second genesis block containing a hash value associated with the third block generated in the master cryptographically verifiable ledger, associated with the third event. The one or more of the nodes is programmed to receive a fourth event. The one or more of the nodes are programmed to generate a fourth block in the second sub cryptographically verifiable ledger containing transaction records associated with the fourth event. The one or more of the nodes are programmed to purge the second sub cryptographically verifiable ledger after a specified amount of time after receiving the fourth event.

The first event is associated with the request of a delivery of a physical object, and the second event is associated with the completion of the delivery of the physical object. The one or more transaction records include one or more of a quantity of the at least one physical object, a name of the at least one physical object, a type of the at least one physical object and a size of the at least one physical object. The third party system is one or more of a: mobile device, a terminal or a computing device. The terminal is disposed in a facility.

Figure 1B:
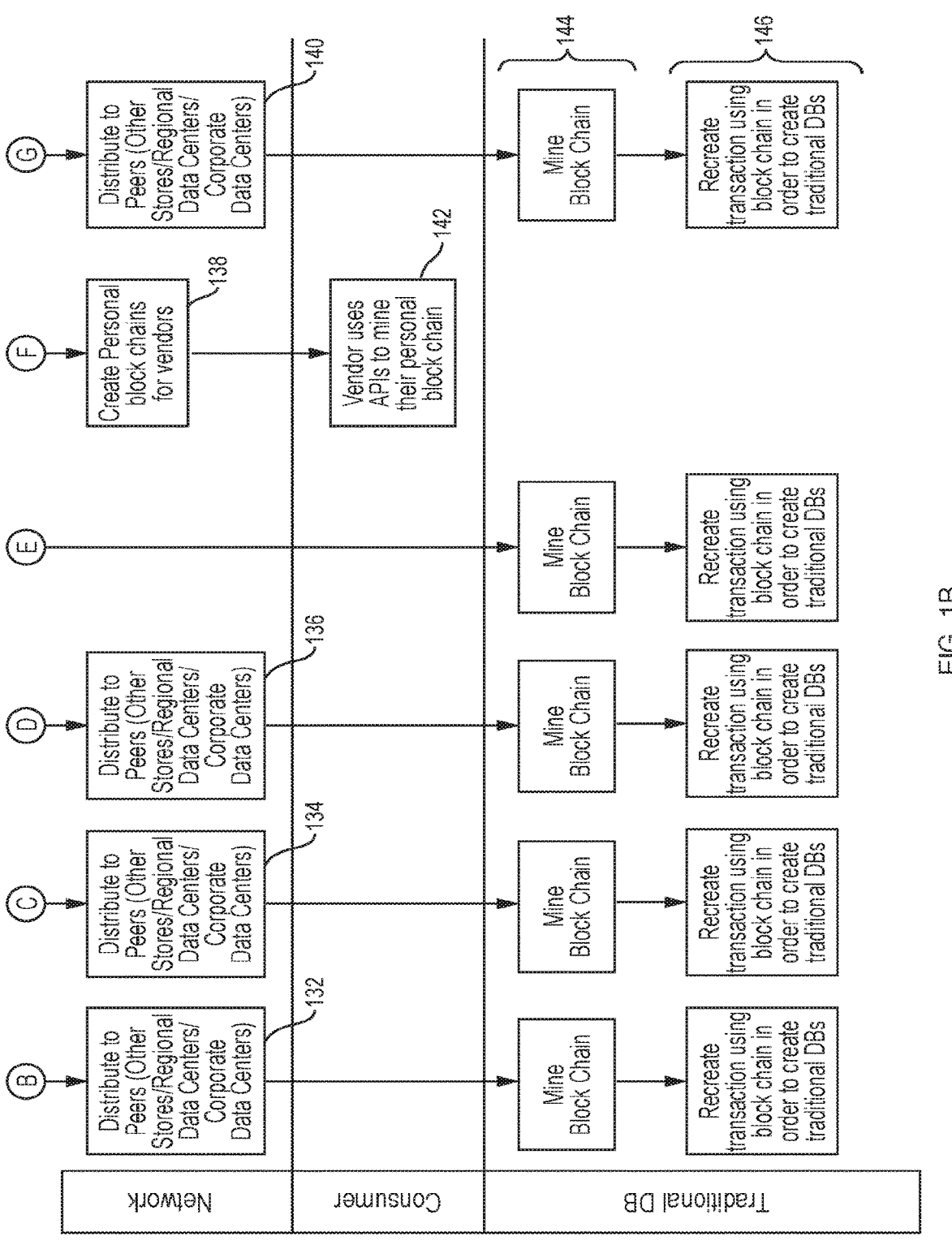
Figure 1C:
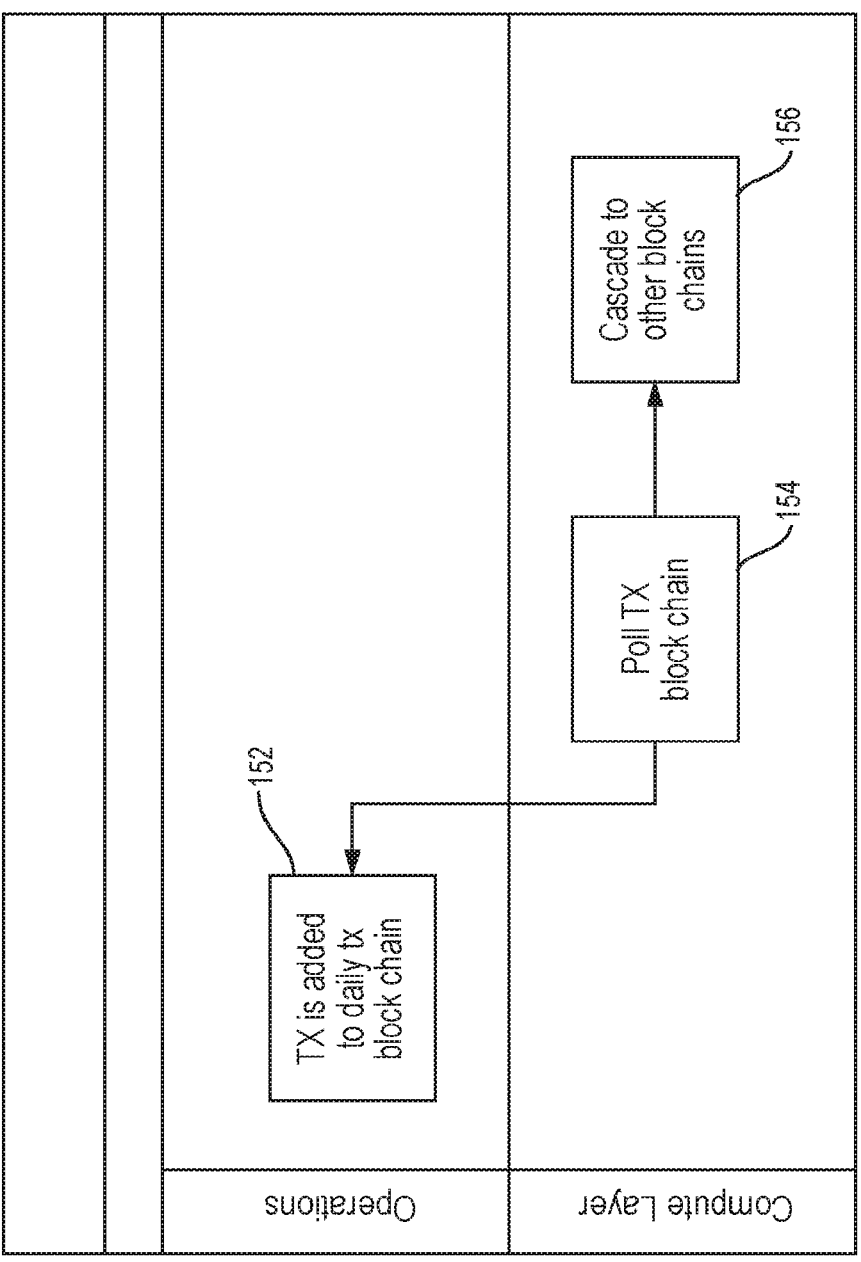

FIGS. 1A-1C are block diagrams illustrating a dataflow while using multiple blockchains in accordance with an exemplary embodiment. With reference to FIG. 1A a blockchain system 100 can include multiple blockchains. The blockchains can store data for different types of data associated with a single event. In operation 101, an event can occur at a facility or in a remote location. In operation 102, the blockchain system 100 can decompose the event into the different component parts. In operation 106, the blockchain system 100 can determine how each domain is affected by the component parts of the event, in response to operation 104, in which the blockchain system 100 can import component dictionary/business rules to determine how each component is affected by the event.

As a non-limiting example, the blockchain system 100 can include a cash-on-hand domain, inventory domain, customer identification domain, N type information domain, customer/vendor identification domain (the customer/vendor identification domain can be external to the blockchain system 100), and a profit & loss (P&L) domain. In operations 108-110, the blockchain system 100 can transmit particular data associated with each domain affected by the event to the cash-on-hand domain, inventory domain, customer identification domain, N type information domain, customer/vendor identification domain, and/or the profit & loss (P&L) domain, respectively. Each domain can be associated to a respective blockchain. Each domain can instruct the respective blockchain to generate a new block in the cryptographically verifiable ledger including the data affected by the event for the respective domain. As an example, the cash-on-hand domain can be associated with a cash-on-hand blockchain; the inventory domain can be associated with an inventory blockchain; customer identification domain can be associated with a customer blockchain, N type information domain can be associated with an N blockchain, customer/vendor identification domain can be associated with a P&L blockchain specific for customers and vendors, and the profit & loss (P&L) domain can be associated with a P&L blockchain. In operations 120-130, the particular data associated with each domain affected by the event transmitted to each respective domain can be respectively stored in the corresponding blockchain; data particular to the cash-on-hand domain can be stored in the cash-on-hand blockchain, data particular to the inventory domain can be stored in the inventory blockchain, data particular to the customer identification domain can be stored in the customer blockchain, data particular to the N type information domain can be stored in the N type blockchain, data particular to the customer/vendor identification domain can be stored in the individual blockchains specific for customers and/or vendors, and data particular to the P&L domain can be stored in the P&L blockchain.

With reference to FIG. 1B, in operations 132-140, the blockchain system 100 can distribute the respective blockchain ledgers to peers computing devices in a distributed network. For example, peers can include one or more of: different facilities, regional data centers, and corporate data centers. The blockchain ledgers can include the particular data associated with each domain affected by the event. In operation 142, third party systems such as vendors can use Application Program Interfaces (APIs) to mine the received blockchain ledger. In operation 144, systems internal to the blockchain system 100 can mine the respective blockchain ledgers. In operation 146, the particular data associated with each domain affected by the event, mined by systems internal to the blockchain system 100 can be committed to a relational database associated with the respective domain.

With reference to FIG. 1C, a blockchain system 100 can include a master blockchain and sub-blockchains (i.e., blockchains associated with the individual domains). In operation 152, a data associated with the event can be stored in a master blockchain. In operation 154, the master blockchain can be polled for new data. In operation 156, the data from the event can be from master blockchain and disseminated to the sub-blockchains.

Figure 2A:
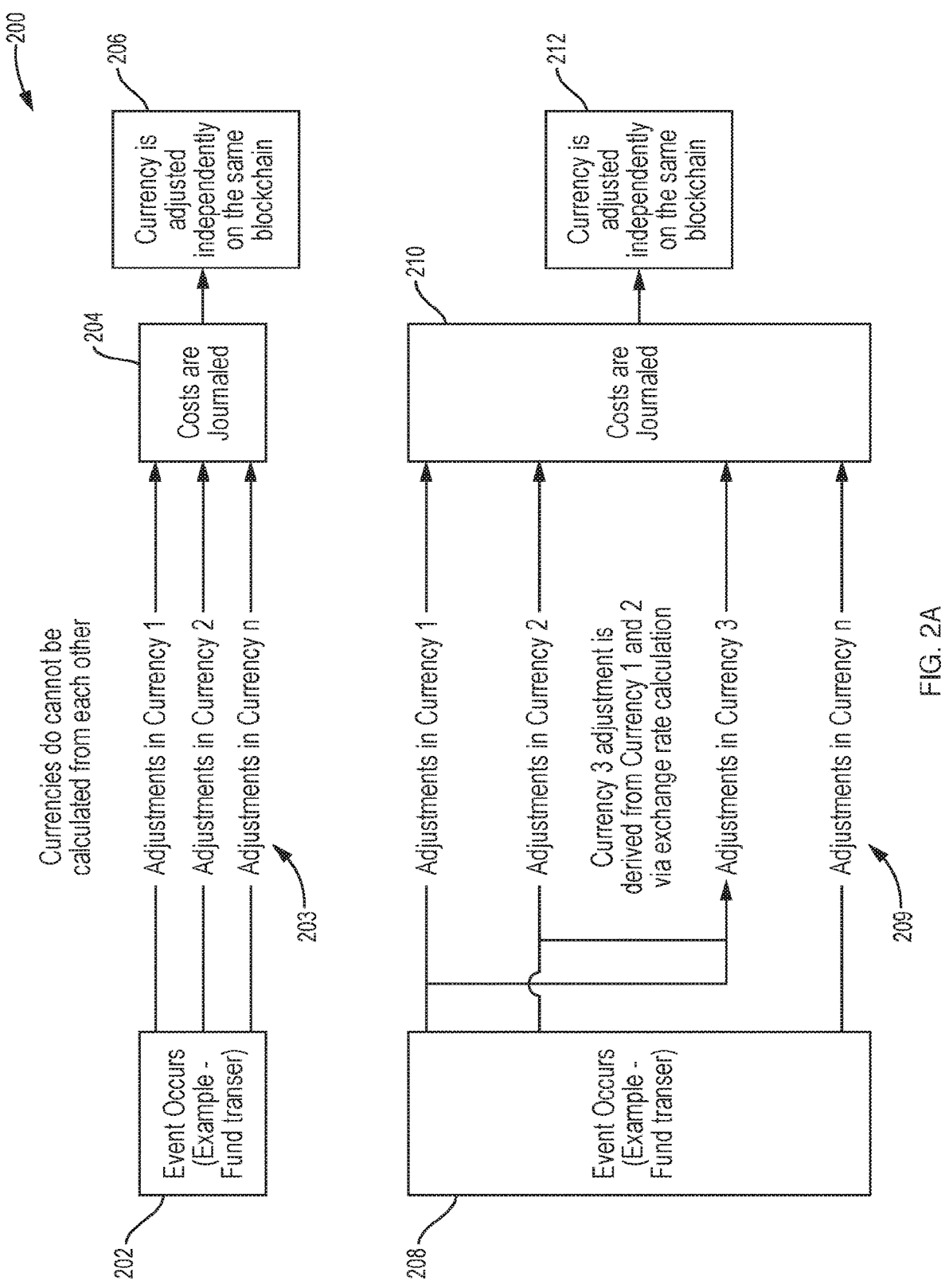
FIG. 2A is a block diagram illustrating components of a multi-variant tracking system in accordance with an exemplary embodiment.

FIG. 2A is a block diagram illustrating components of a multi-variant tracking system 200 in accordance with an exemplary embodiment. The multi-variant tracking system 200 can include multiple independently operated domains. Each independently operated domain can be associated with a cryptographically verifiable ledger represented by a sequence of blocks. Each block can contain one or more transactions records and each subsequent block can contain a hash value associated with the previous block. The multi-variant tracking system 200 can also include a master (or daily) cryptographically verifiable ledger. In operation 202, the multi-variant tracking system 200 can receive an event. The event can include transaction records including first data values of a first type. The multi-variant tracking system 200 can determine data stored in the blocks of the cryptographically verifiable ledgers of the independently operated domains that are affected by the event. The multi-variant tracking system 200 can determine a type of data values associated with other transaction records in each cryptographically verifiable ledger for the independently operated domains that are affected by the event. In operation 203, the multi-variant tracking system 200 can convert the first data value of the first type to a corresponding change in a data value of a different type of data value associated with transaction records in each cryptographically verifiable ledger for each of the independently operated domains that are affected by the event. In operation 204, additional new blocks containing transaction records associated with the change of the different type of data value can be generated in each cryptographically verifiable ledger associated independently operated domains that are affected by the event. In operation 206, a new block including data of the original type of data values included in the event can be generated in the master cryptographically verifiable ledger.

In one embodiment, in operation 208, the multi-variant tracking system 200 can receive an event. The event can include first data values of a first type. The multi-variant tracking system can determine data stored in the cryptographically verifiable ledgers of the independently operated domains that are affected by the event. The multi-variant tracking system 200 can determine a type of data value associated with other transaction records in each cryptographically verifiable ledger for the independently operated domains that are affected by the event. In operation 209, the multi-variant tracking system 200 can convert the first data value of the first type to a corresponding change in a data value of a different type of data value associated with transaction records in each cryptographically verifiable ledger for each of the independently operated domains that are affected by the event. The multi-variant tracking system 200 can determine if a specific data value is dependent on a change in data values in one or more different cryptographically verifiable ledgers. The multi-variant tracking system 200 can derive the change in the specific data value from the change in data values in the one or more different cryptographically verifiable ledgers. In operation 210, additional new blocks containing transaction records associated with the change of the different type of data value can be generated in each cryptographically verifiable ledger associated independently operated domains, affected by the event. In operation 212, a new block including data of the original type of data values included in the event can be generated in the master cryptographically verifiable ledger.

Figure 2B:
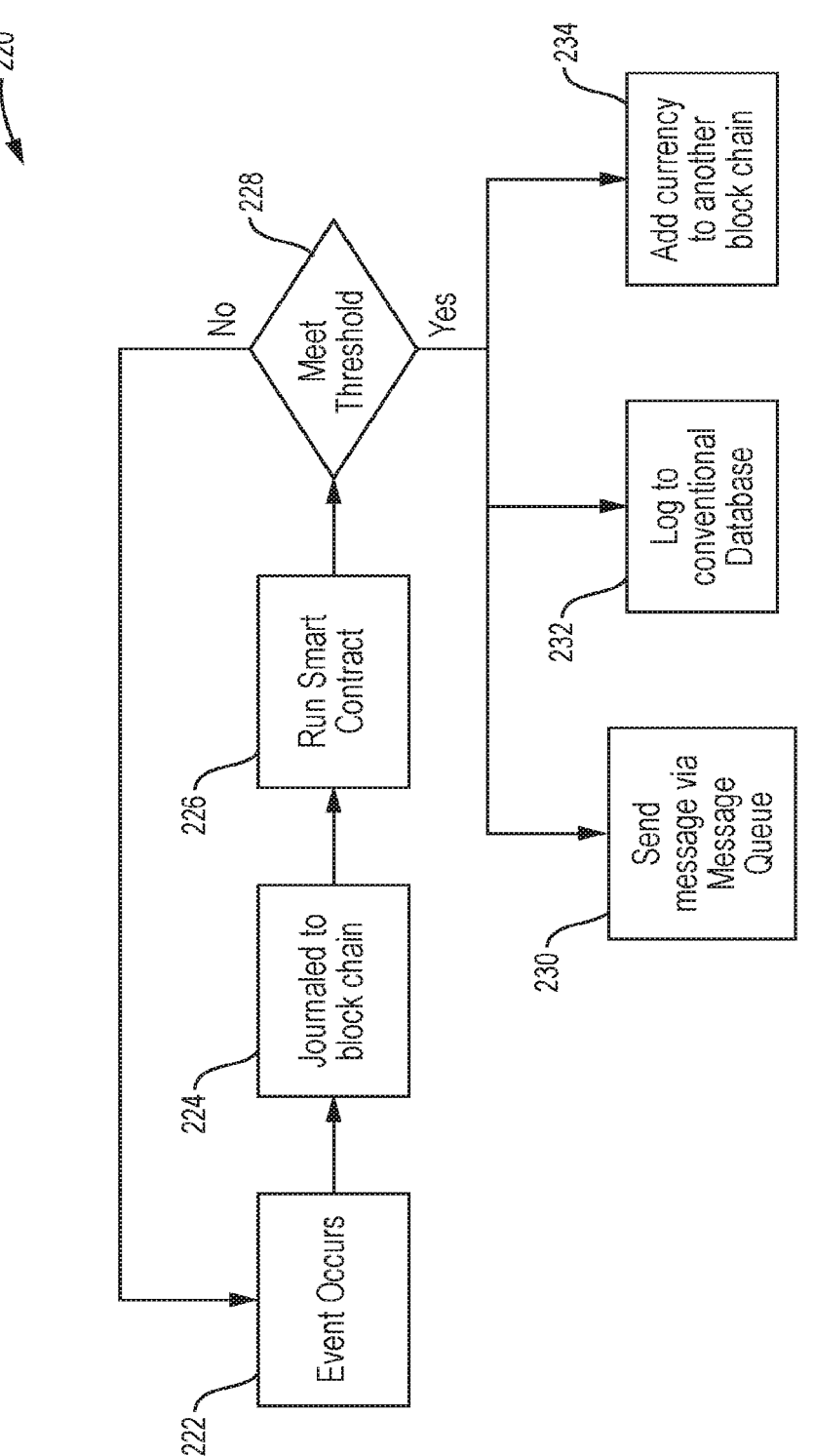
FIG. 2B is a block diagram illustrating components of an exception handling system in accordance with an exemplary embodiment.

FIG. 2B is a block diagram illustrating components of an exception handling system 220 in accordance with an exemplary embodiment. The exception handling system can include multiple independently operated domains. Each independently operated domain can be associated with a distinct cryptographically verifiable ledger represented by a sequence of blocks. Each block can contain one or more transactions records and each subsequent block contain a hash value associated with the previous block. In operation 222, the exception handling system 220 can receive an event including transaction records. In operation 224, a first independently operated domain can generate a new block in the cryptographically verifiable ledger associated with the independently operated domain. The new block can store the transaction records associated with the event. In operation 226, the exception handling system 220 can receive an alert of the creation of the new block storing the transaction records of the event in the cryptographically verifiable ledger of the first independently operated domain. The exception handling system 220 can initiate a smart contract based on the transaction records stored in the cryptographically verifiable ledger of the first independently operated domain. As an example, the smart contract can include a triggering event based on the transaction records of the event. The triggering event can be a specified threshold.

In operation 228, the exception handling system 220 can determine whether the threshold (i.e., triggering event) has been satisfied. If not, the process waits for the next event. In response the determining the threshold has been satisfied, the exception handling system 220 can identify an error in one or more of the independently operated domains that are different than the first independently operated domain. In operation 230, a message indicating the error can be transmitted to the one or more independently operated domains. In operation 232, the exception handling system 220 can store the error in a relational database. In operation 234, the exception handling system 220 can trigger creation of additional new blocks in each cryptographically verifiable ledger associated with the one or more of the plurality of independently operated domains. The additional new blocks can contain information associated with the error. The exception handling system can trigger an action to resolve the error for each of the one or more independently operated domains.

Figure 2C:
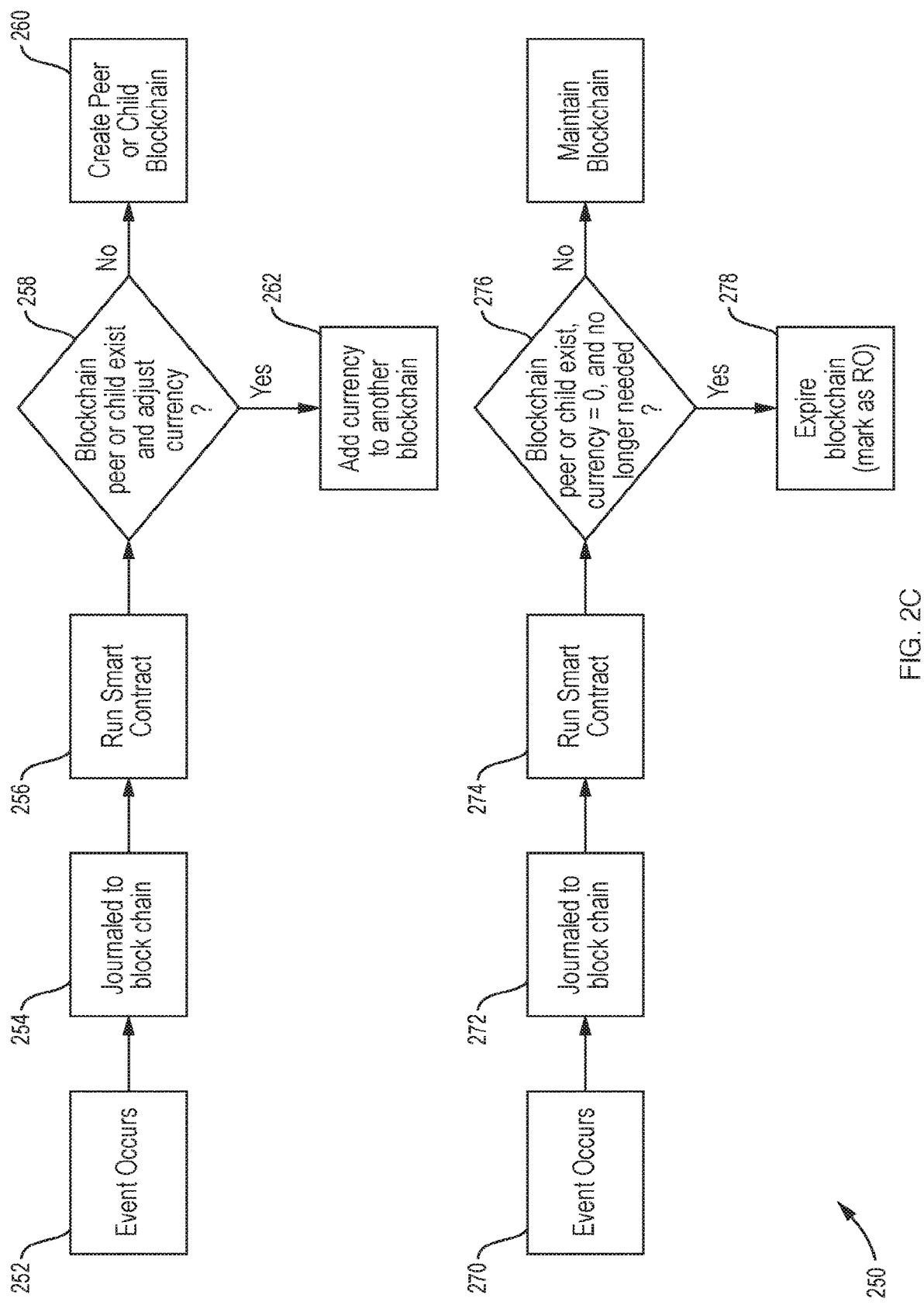
FIG. 2C is a block diagram illustrating components of a multi-variant tracking system in accordance with an exemplary embodiment.

FIG. 2C is a block diagram illustrating components of a nested blockchain system 250 in accordance with an exemplary embodiment. The exception handling system can include multiple distributed nodes in a network. In operation 252, an event can be transmitted to the nested blockchain system 250 from third party system. In operation 254, the nested handling system 250 can generate a first block in the master cryptographically verifiable ledger for a first event in response to receipt of the first event from a third party system. In operation 256, the nested blockchain system 250 can initiate a smart contract by executing code included in an associated block of the master cryptographically verifiable ledger to verify that the first event corresponds with a first set of one or more conditions. In operation 258, the nested blockchain system 250 can determine whether a sub cryptographically verifiable ledger associated with the first event currently exists. In operation 260, in response to determining the sub cryptographically verifiable ledger already exists, the nested blockchain system 250 can generate a genesis block containing a hash value referencing the new block generated in the master cryptographically verifiable ledger. In operation 262, in response to determining the sub cryptographically verifiable ledger does not exist, the nested blockchain system 250 can spawn a sub cryptographically verifiable ledger represented generate genesis block containing a hash value referencing the new block generated in the master cryptographically verifiable ledger.

In operation 270, an event can be transmitted to the nested blockchain system 250 from third party system. In operation 272, the nested handling system 250 can generate a first block in the master cryptographically verifiable ledger for a first event in response to receipt of the first event from a third party system. In operation 274, the nested blockchain system 250 can initiate a smart contract by executing code included in an associated block of the master cryptographically verifiable ledger to verify that the event corresponds with one or more conditions. In operation 276, the nested blockchain system 250 can determine whether a sub cryptographically verifiable ledger is no longer needed based on the event corresponding to one or more conditions. In operation 278, in response to determining the sub cryptographically verifiable ledger is no longer needed, the sub cryptographically verifiable ledger is purged, otherwise it is maintained . . . .

Figure 3A:
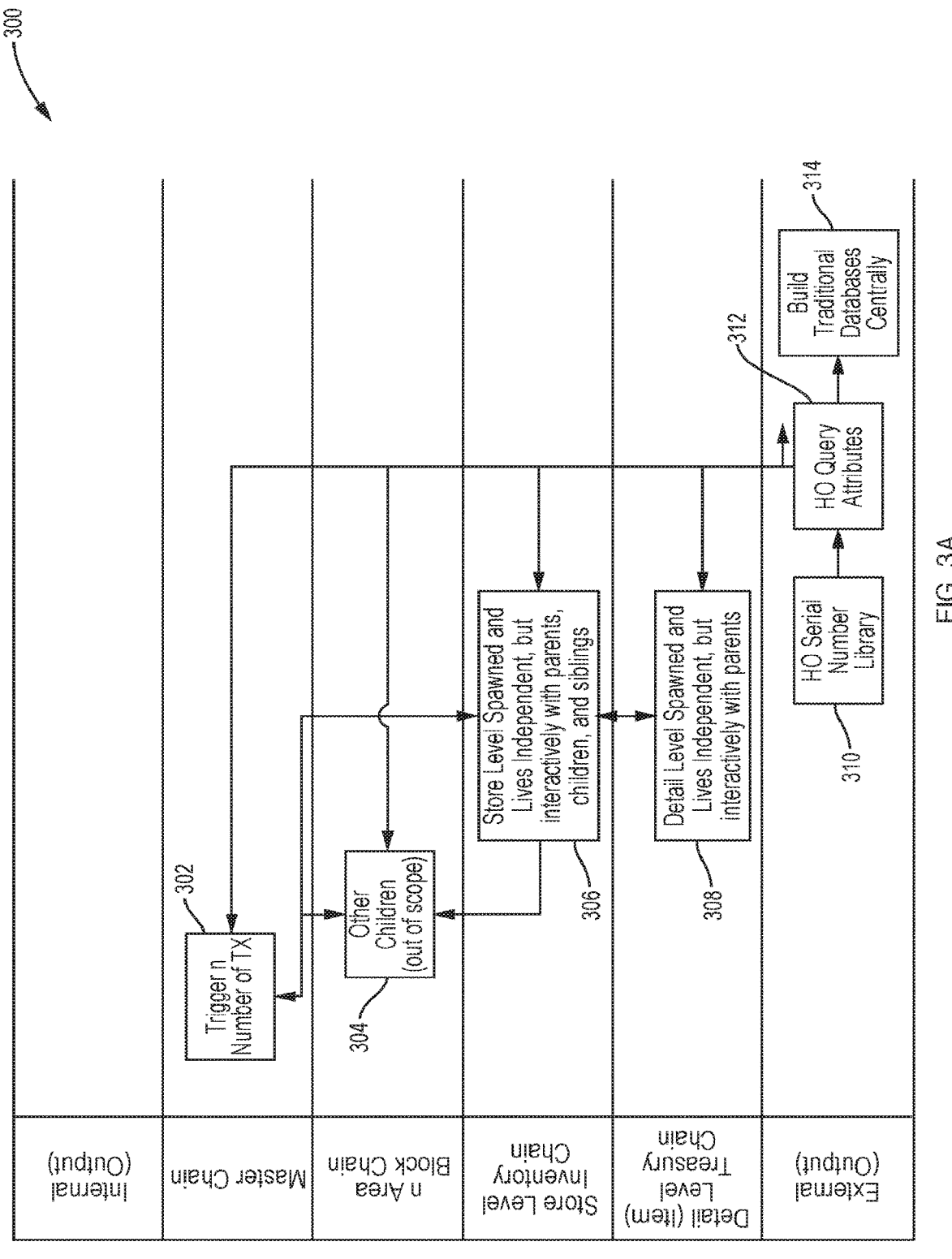
FIGS. 3A-F is a block diagram illustrating components of an inventory blockchain in accordance with an exemplary embodiment.

FIGS. 3A-F is a block diagram illustrating components inventory blockchain 300 in accordance with an exemplary embodiment. With reference to FIG. 3A, the inventory blockchain 300 can include a master blockchain, an n area blockchain, facility level inventory blockchain, detail level blockchain and external output. The inventory blockchain 300 can include multiple sub-blockchains. Each sub-blockchain can be associated with a parent blockchain. A sub-blockchain may be associated with a further sub-blockchain. The master blockchain and each sub-blockchain can include cryptographically verifiable ledgers that are represented by a sequence of blocks. Each block can contain one or more transactions records and each subsequent block can contain a hash value associated with the previous block. The first block in the cryptographically verifiable ledger of a sub-blockchain can include a hash value associated with a block in cryptographically verifiable ledger of its parent block-chain.

In operation 302, the master blockchain can receive an event including transaction records. The master blockchain can trigger multiple transactions based on the received event. In operation 304, the transactions can be transmitted to children (i.e., sub-blockchains). Alternatively, or in addition, in operation 306, the master blockchain can transmit the transactions to the facility level blockchain. The facility level blockchain can include multiple sub-blockchains. The sub-blockchains can have parent/child and/or sibling relationships. In operation 308, the transactions can be transmitted to the detail level blockchain. The detail level blockchain can be a sub-blockchain which can reside independently and interact with parent blockchains. As a non-limiting example, the inventory blockchain 300 can be implemented in a retail store environment.

Figure 3B:
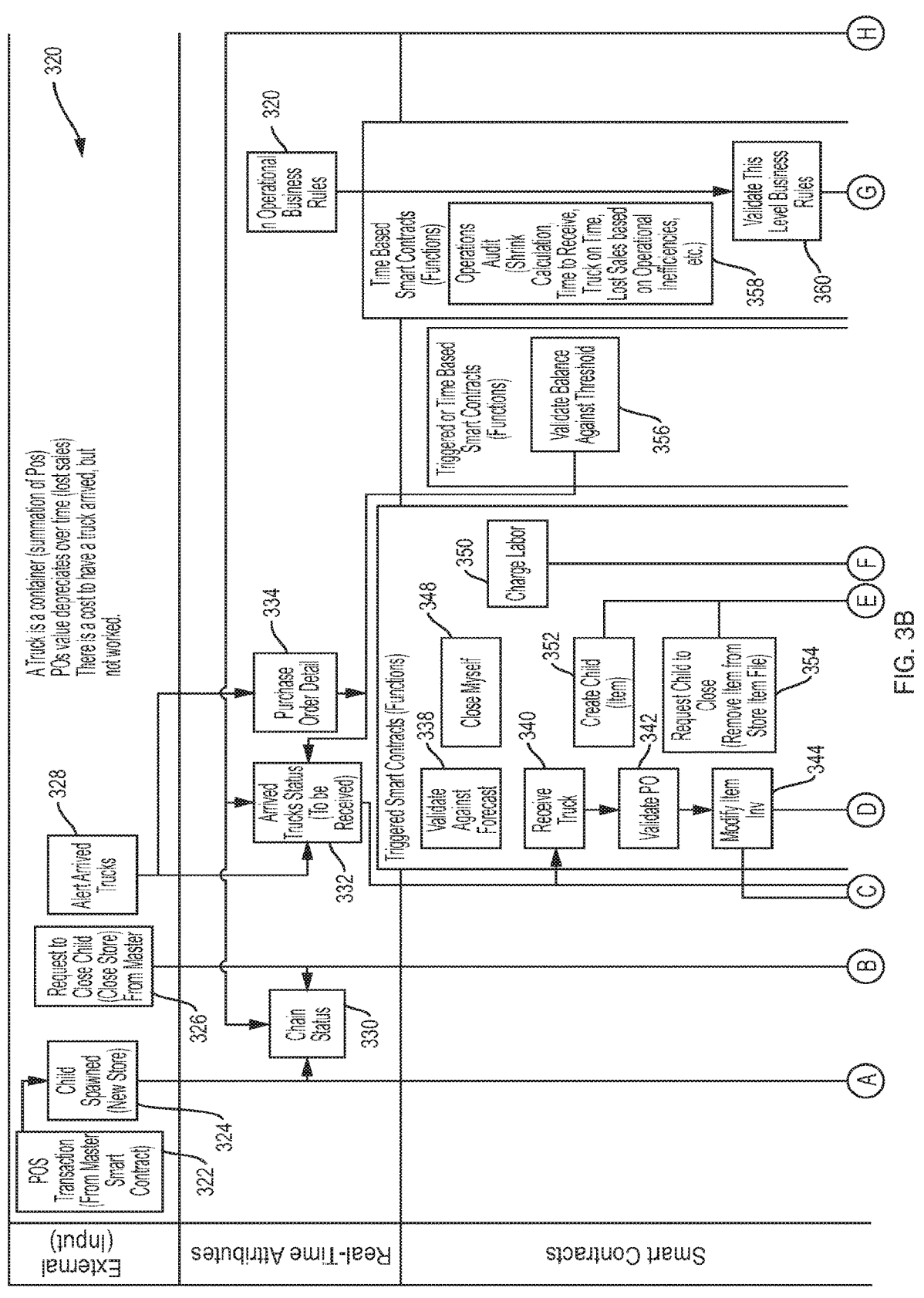
Figure 3C:
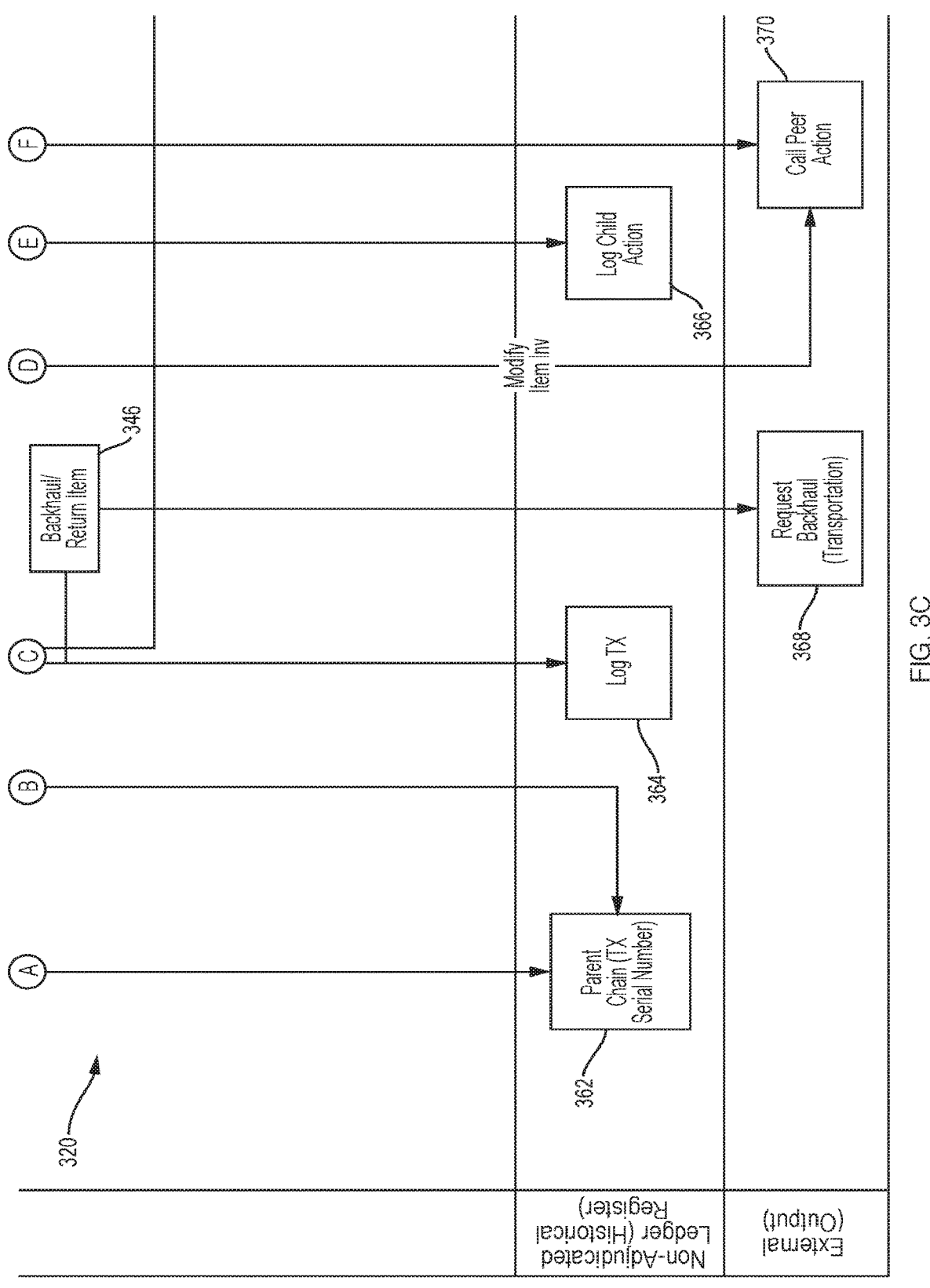
Figure 3D:
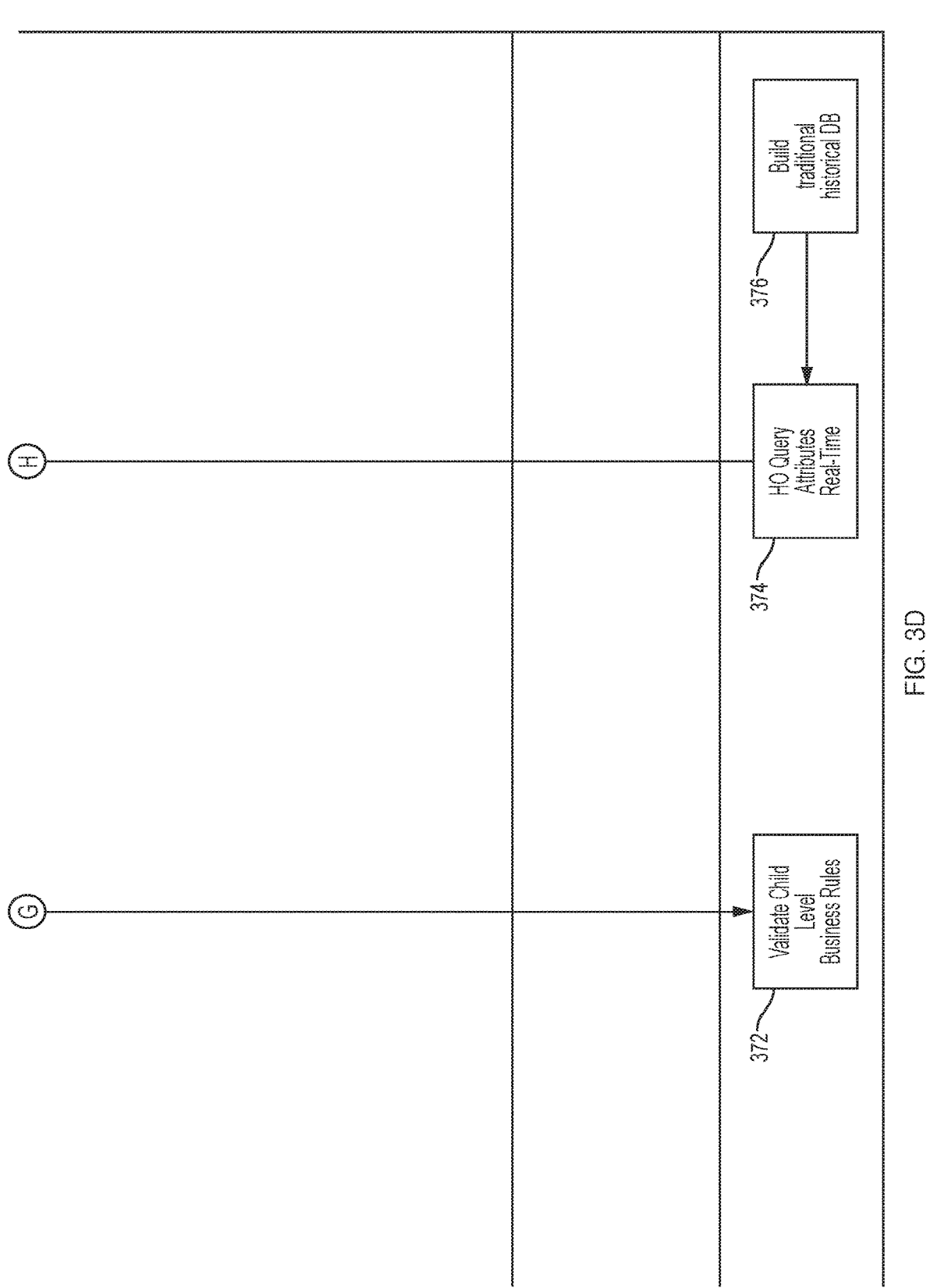

With reference to FIGS. 3B-3D concurrently, the facility of the facility level blockchain 320 can be retail store. The facility level blockchain can include a cryptographically verifiable ledger represented by a sequence of blocks. Each block can contain one or more transactions records and each subsequent block can contain a hash value associated with the previous block. In operation 322, the facility level blockchain 320 can receive an event based on a Point Of Sale (POS) transaction in the retail store. In operation 324, a new sub-blockchain can be spawned based on the event. The first block of the sub-blockchain can be generated and can include the POS transaction records. In operation 362, the sub-blockchain can retrieve its parent blockchain hash value and store the hash value in the first block. In operation 330, the status of the new sub-blockchain can be updated. In operation 326, the facility level blockchain 320 can receive a request to purge the new sub-blockchain. In operation 362, the hash value of the parent blockchain of the new sub-blockchain can be retrieved and the new sub-blockchain can be purged. In operation 330, the chain status is updated to reflect the purged new sub-blockchain.

In operation 328, the facility level blockchain 320 can receive a new event corresponding to a truck arriving with item inventory. The facility level blockchain 320 can generate new block in the cryptographically verifiable ledger including the transaction records of a truck arriving with item inventory. In operation 332, the status of the truck can be updated. In operation 334, the purchase order details associated with the item inventory in the truck can be updated. In response to updating the truck status, smart contract functions 336 can be triggered to execute. In particular, in operation 340, the received truck smart contract can be triggered to execute based on the truck arriving at the retail store with item inventory. The received truck smart contract can update the status of the truck which was anticipated to arrive. A new block in the facility level blockchain 320 can be generated. The new block can include the status of the arrived truck. In operation 342, in response to the received truck smart contract being triggered to execute, a validate purchase order smart contract can be triggered. The validate purchase order smart contract can validate the purchase orders of the items delivered in the truck. A new block in the facility level blockchain 320 can be generated. The new block can include the validation of the purchase orders. In operation 344, in response to the validate purchase order smart contract being triggered to execute, the modify item inventory smart contract can be triggered to execute. The modify item inventory smart contract can modify the item inventory based on the new item inventory delivered. A new block in the facility level blockchain 320 can be generated. The new block can include the new item inventory. In response to the modify inventory item smart contract being triggered to execute, in operation 364, the transaction can be logged in a relational database. In response to the modify inventory item smart contract being triggered to execute, in operation 370, a peer/sibling blockchain associated with the item inventory can be updated.

Additional smart contracts can include validating the forecast smart contract 338, backhaul/return item smart contract 346, close myself smart contract 348, charge labor smart contract 350, create child (i.e., sub-blockchain) smart contract 352, and request a child to close smart contract 354. In response to triggering the create child and/or request a child to close smart contract, in operation 366, the triggered action can be logged in a relational database. In response to triggering the backhaul/return item smart contract, in operation 368, a backhaul/transportation of the returned item can be requested. In response to the charge labor smart contract being triggered, in operation 370, a peer/sibling blockchain associated with the labor information is updated.

In response to the truck status being updated, in operation 356, time-based smart contracts can be triggered to execute. A validation of the balance against a threshold smart contract can be triggered to execute. In operation 320, n Operational Business Rules can trigger time-based smart contracts, such as a validation of business rules smart contract, to execute. An additional time-based smart contract, an operational audit smart contract, can also be triggered to execute. In response to the validation of business rules smart contract being triggered to execute, in operation 372, the sub-blockchain business rules can be validated. In operation 374, real-time attributes associated with the various blockchains can be queried. In operation 376, a traditional relational database can store all the information in the various blockchains.

Figure 3E:
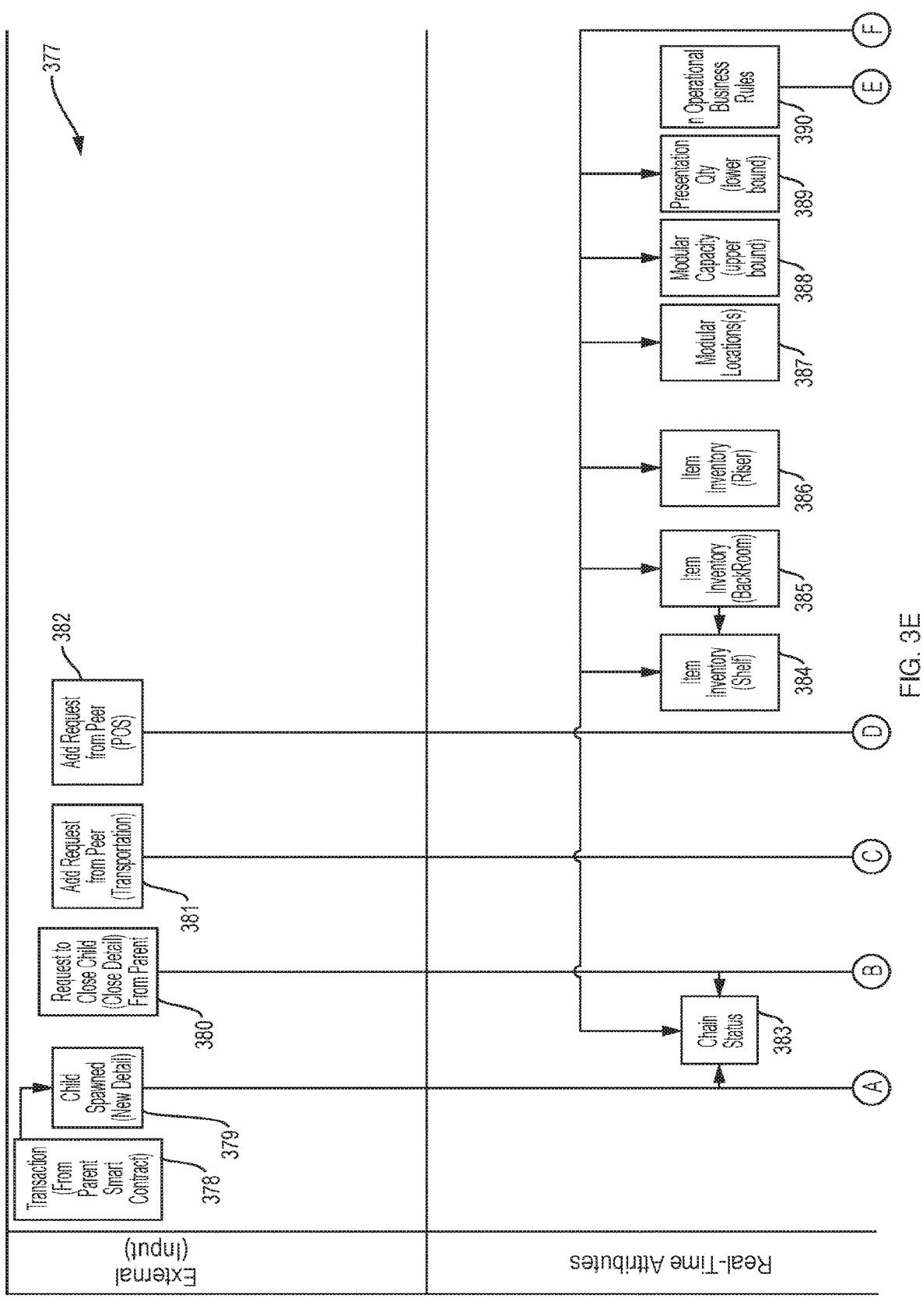
Figure 3F:
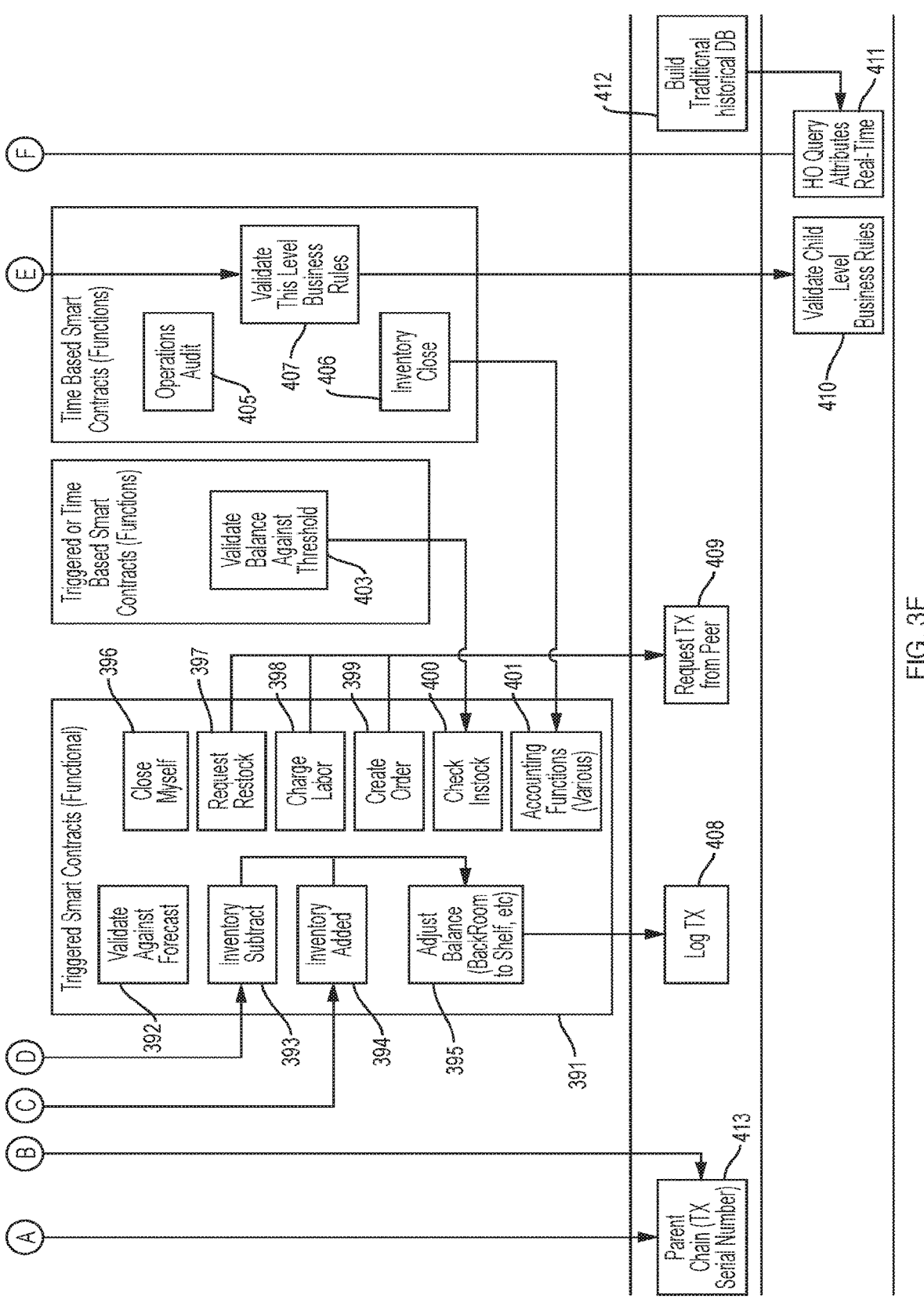

With reference to FIG. 3E-3F concurrently, the detail level blockchain 377 can include master and sub-blockchains, each blockchain including a cryptographically verifiable ledger represented by a sequence of blocks. Each block can contain one or more transactions records and each subsequent block can contain a hash value associated with the previous block. In operation 378, the detail level blockchain 377 can receive an event based on a transaction. In operation 379, a new sub-blockchain can be spawned based on the event. The first block of the sub-blockchain can be generated and can include the transaction records. In operation 413, the sub-blockchain can retrieve its parent blockchain hash value and store the hash value in the first block. In operation 483, the status of the new sub-blockchain can be updated. In operation 380, the detail level blockchain 377 can receive a request to purge the new sub-blockchain. In operation 413, the hash value of the parent blockchain of the new sub-blockchain can be retrieved. The hash value of the parent blockchain can be used for authorization to purge the new sub-blockchain. In operation 383, the chain status is updated to reflect the purged new sub-blockchain.

In operation 381, the detail level blockchain 377 can receive a request from a peer such as a transportation blockchain. For example, a truck can arrive at the retail store with new item inventory. In response to receiving a request from the transportation blockchain, the smart contracts 391 can be triggered to execute. In operation 394, the inventory added smart contract can be triggered to execute. The inventory added smart contract can be executed to add the inventory added by the new items being delivered to the retail store. In operation 382, the detail level blockchain 377 can receive a request from a peer such as a POS blockchain indicating sold items at the retail store. In operation 393, the inventory subtract smart contract can be triggered to execute. The inventory subtract contract can be executed to subtract the items sold from the inventory. In response to executing the inventory add and inventory subtract smart contracts, in operation 395, the adjust balance smart contract can be triggered to execute. The adjust balance smart contract can be executed to adjust the items from the backroom to the shelving units on the sales floor of the retail store. In response to executing the adjust balance smart contract, in operation 408, the transaction can be logged in a relational database.

Additional smart contracts can be triggered to execute, such as validating a forecast smart contract 392, a close myself smart contract 396, a request restock smart contract 397, a charge labor smart contract 399, and a create order smart contract 398. In response to executing the charge labor smart contract and the create smart order contract 396, the detail level blockchain 377 can request transactions from peer/sibling blockchains.

In operation 403, a time-based smart contract, such as a validate balance against threshold smart contract, can be triggered to execute. In response to executing the validate balance against threshold smart contract, in operation 400, the check in-stock smart contract can be triggered to execute. The check instock smart contract can be executed to verify products are in stock. In operation 406, a time-based smart contract, such as an inventory close smart contract, can be triggered to execute. In response to executing the inventory close smart contract, in operation 401, the accounting functions smart contract can be triggered to execute. The check in-stock smart contract can be executed to verify products are in stock. In operation 405, the time-based smart contract, operations audit, can be triggered to execute.

In operation 390, n Operational Business Rules can call the time-based smart contracts, such as a validation of business rules smart contract. In operation 407, the validation of business rules smart contract can be triggered to execute. In operation 410, in response to the validation of business rules smart contract being triggered to execute, the sub-blockchain business rules can be validated.

In operation 411, the blockchains can be queried to retrieve attributes associated with the blockchains. The blockchains can include one or more of, item inventory (shelf) 384, item inventory (backroom) 385, item inventory (riser) 386, modular locations 387, modular capacity 388, and presentation quantity 389. In operation 412, a relational database can be generated to store the information in the detail level blockchain 377.

FIGS. 4A-D is a block diagram illustrating components treasury blockchain in accordance with an exemplary embodiment. The treasury blockchain can include multiple sub-blockchains. Each sub-blockchain can be associated with a parent blockchain. A sub-blockchain may be associated to a further sub-blockchain. A master blockchain and each sub-blockchain include cryptographically verifiable ledgers that are represented by a sequence of blocks. Each block can contain one or more transactions records and each subsequent block can contain a hash value associated with the previous block. The first block in the cryptographically verifiable ledger of a sub-blockchain can include a hash value associated with a block in cryptographically verifiable ledger of its parent blockchain. As a non-limiting example, the treasury blockchain can be implemented in a retail store.

Figure 4A:
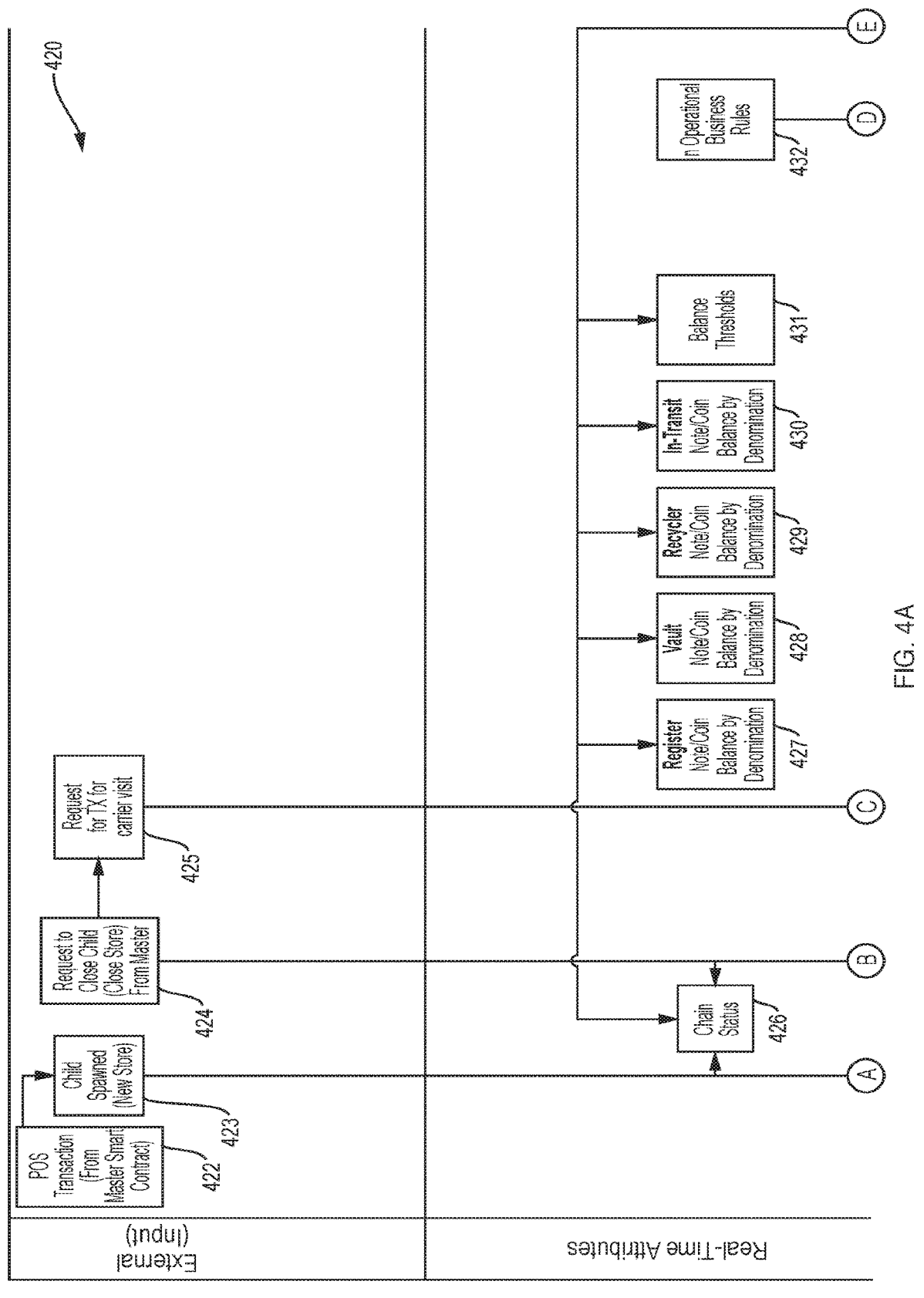
FIGS. 4A-D is a block diagram illustrating components of a treasury blockchain in accordance with an exemplary embodiment.
Figure 4B:
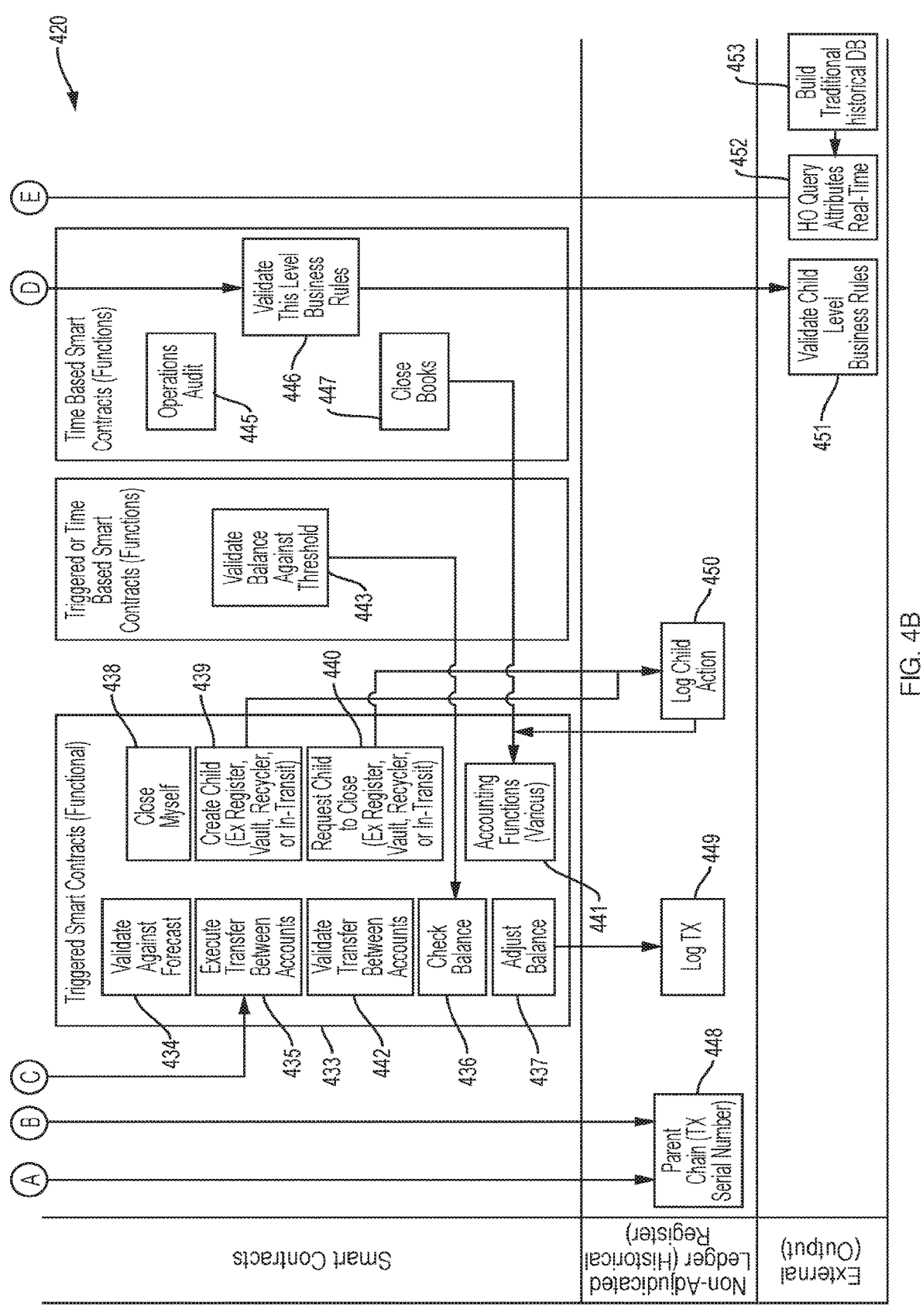

With reference to FIGS. 4A-4B concurrently, the treasury blockchain can include a facility level blockchain 420. The facility associated with the facility level blockchain 420 can be retail store. The facility level blockchain can include a cryptographically verifiable ledger represented by a sequence of blocks. Each block can contain one or more transactions records and each subsequent block can contain a hash value associated with the previous block. In operation 422, the facility level blockchain 420 can receive an event based on a POS transaction. In operation 423, a new sub-blockchain can be spawned based on the event. The first block of the sub-blockchain can be generated and can include the transaction records. In operation 448, the sub-blockchain can retrieve its parent blockchain hash value and store the hash value in the first block. In operation 426, the status of the new sub-blockchain can be updated. In operation 424, the facility level blockchain 420 can receive a request to purge the new sub-blockchain. In operation 448, the hash value of the parent blockchain of the new sub-blockchain can be retrieved and the new sub-blockchain can be purged. In operation 426, the chain status is updated to reflect the purged new sub-blockchain.

In operation 425, the facility level blockchain 420 can receive a request for a transaction for a carrier visit. In response to receiving a request for a transaction for a carrier visit, the smart contracts 433 can be triggered to execute. In operation 435, the execute transfer between accounts smart contract can be triggered to execute. The execute transfer between accounts smart contract can be executed to transfer currency between accounts. In response to executing the execute transfer between accounts smart contract, in operation 442, validate transfer between accounts smart contract can be triggered to execute. In response to executing, the validate transfer between accounts smart contract, in operation 436 the adjust balance smart contract can be triggered to execute. In response to executing the adjust balance smart contract, in operation 449, the transaction can be logged in a relational database.

Additional smart contracts can be triggered to execute, such as validating a forecast smart contract 434, close myself smart contract 438, create child smart contract 439 and request child to close smart contract 440. In response to executing the create child smart contract and request child to close smart contract, in operation 450, the child action is logged in a relational database.

In operation 443, a time-based smart contract, validate balance against threshold smart contract, can be triggered to execute. In response to executing the validate balance against threshold smart contract, in operation 436, the check balance smart contract can be triggered to execute. In operation 447, a time-based smart contract, close books smart contract, can be triggered to execute. In response to executing the inventory close smart contract, in operation 441, the accounting functions smart contract can be triggered to execute. In operation 445, the time-based smart contract, operations audit, can be triggered to execute.

In operation 432, n Operational Business Rules can call the time-based smart contracts, such as a validation of business rules smart contract. In operation 446, the validation of business rules smart contract can be triggered to execute. In operation 451, in response to the validation of business rules smart contract being triggered to execute, the sub-blockchain business rules can be validated.

In operation 452, the blockchains can be queried to retrieve attributes associated with the blockchains. The blockchains can include one or more of a register note/coin balance by denomination 427, a vault note/coin balance by denomination 428, a recycler note/coin balance by denomination 429, an in-transit note/coin balance by denomination 430, and a balance thresholds 431. In operation 453, a traditional relational database can be generated to store the information stored in the facility level blockchain 420.

Figure 4C:
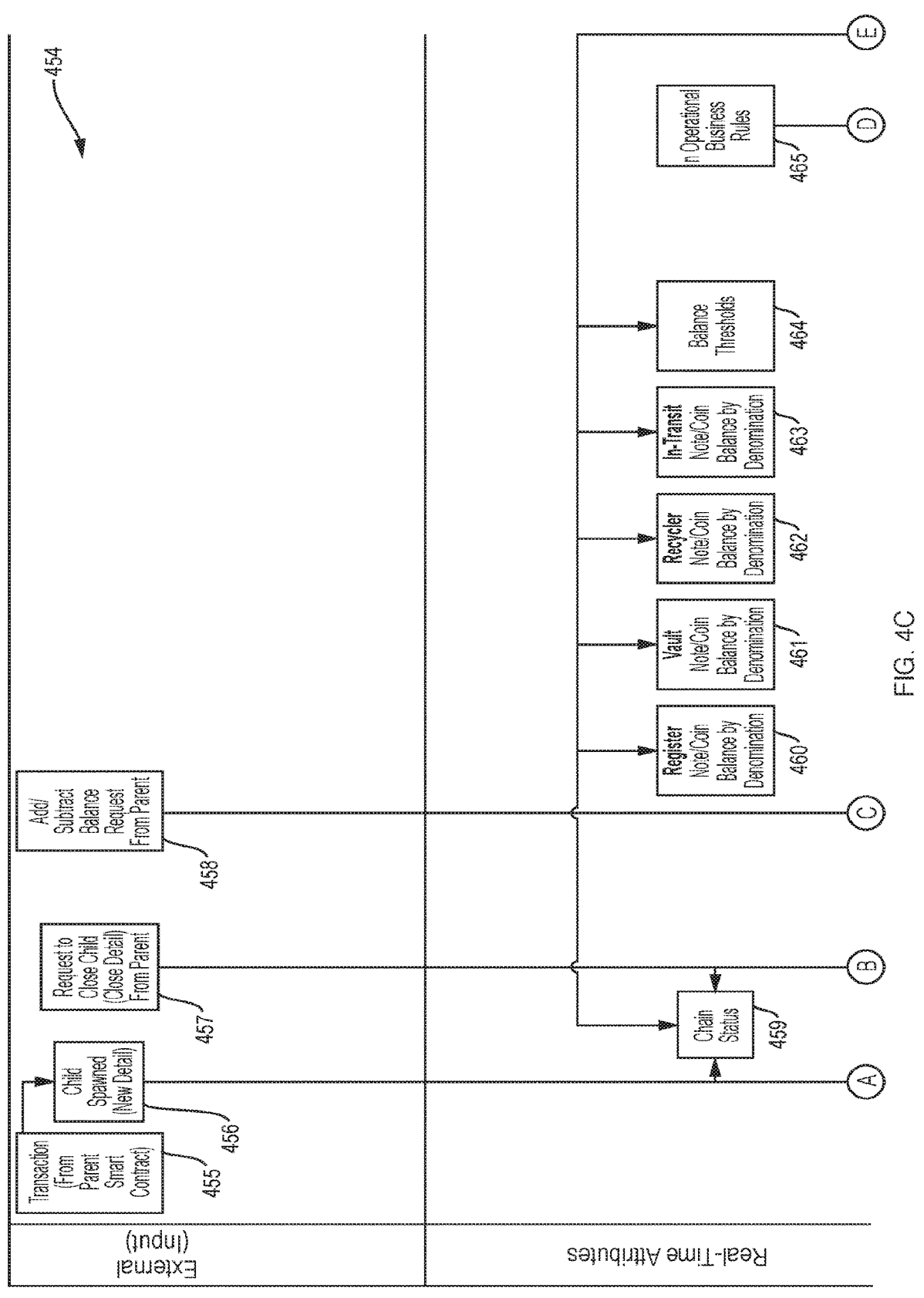
Figure 4D:
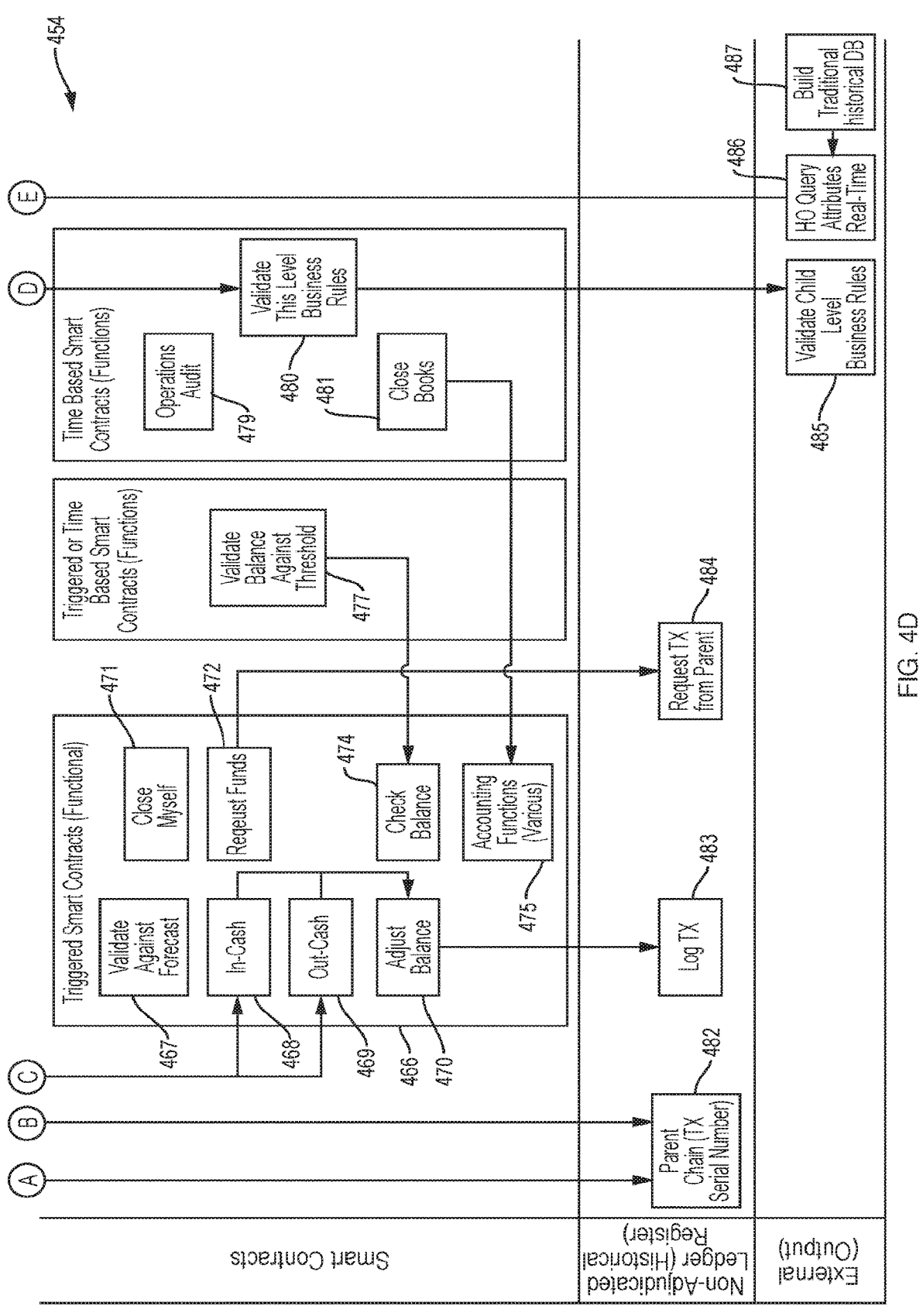

With reference to FIGS. 4C-4D concurrently, the treasury blockchain can include a detail level blockchain 454. The detail level blockchain 454 can include master and sub-blockchains, and each blockchain can include a cryptographically verifiable ledger represented by a sequence of blocks. Each block can contain one or more transactions records and each subsequent block can contain a hash value associated with the previous block. In operation 455, the detail level blockchain 454 can receive an event based on a transaction. In operation 456, a new sub-blockchain can be spawned based on the event. The first block of the sub-blockchain can be generated and can include the transaction records. In operation 482, the sub-blockchain can retrieve its parent blockchain hash value and store the hash value in the first block. In operation 459, the status of the new sub-blockchain can be updated. In operation 457, the detail level blockchain 454 can receive a request to purge the new sub-blockchain. In operation 482, the hash value of the parent blockchain of the new sub-blockchain can be retrieved and the new sub-blockchain can be purged. In operation 426, the chain status is updated to reflect the purged new sub-blockchain.

In operation 458, the detail level blockchain 454 can receive a request for adding/subtracting from the balance from a parent blockchain. In response to receiving a request adding/subtracting from the balance, the smart contracts 466 can be triggered to execute. In operation 468, the in-cash smart contract can be triggered to execute. In operation 469, the out-cash contract can be triggered to execute. In response to executing the in or out cash smart contracts, in operation 470, the adjust balance smart contract can be triggered to execute. In response to executing the adjust balance smart contract, in operation 482, the transaction can be logged in a relational database.

Additional smart contracts can be triggered to execute such as validating a forecast smart contract 467, a close myself smart contract 471, and a request funds smart contract 472. In response to executing the request funds smart contract smart contract, in operation 484, a request for the transaction can be made to the parent blockchain.

In operation 477, a time-based smart contract, a validate balance against threshold smart contract, can be triggered to execute. In response to executing the validate balance against threshold smart contract, in operation 474, the check balance smart contract can be triggered to execute. In operation 481, a time-based smart contract, close books smart contract can be triggered to execute. In response to executing the inventory close smart contract, in operation 475, the accounting functions smart contract can be triggered to execute. In operation 479, the time-based smart contract, operations audit, can be triggered to execute.

In operation 465, n Operational Business Rules can call the time-based smart contracts, such as a validation of business rules smart contract. In operation 480, the validation of business rules smart contract can be triggered to execute. In operation 485, in response to the validation of business rules smart contract being triggered to execute, the sub-blockchain business rules can be validated.

In operation 486, the blockchains can be queried to retrieve attributes associated with the blockchains. The blockchains can include one or more of a register note/coin balance by denomination 460, a vault note/coin balance by denomination 461, a recycler note/coin balance by denomination 462, an in-transit note/coin balance by denomination 463, and a balance thresholds 464. In operation 487, a traditional relational database can be generated to store the information in the detail level blockchain 454.

Figure 5:
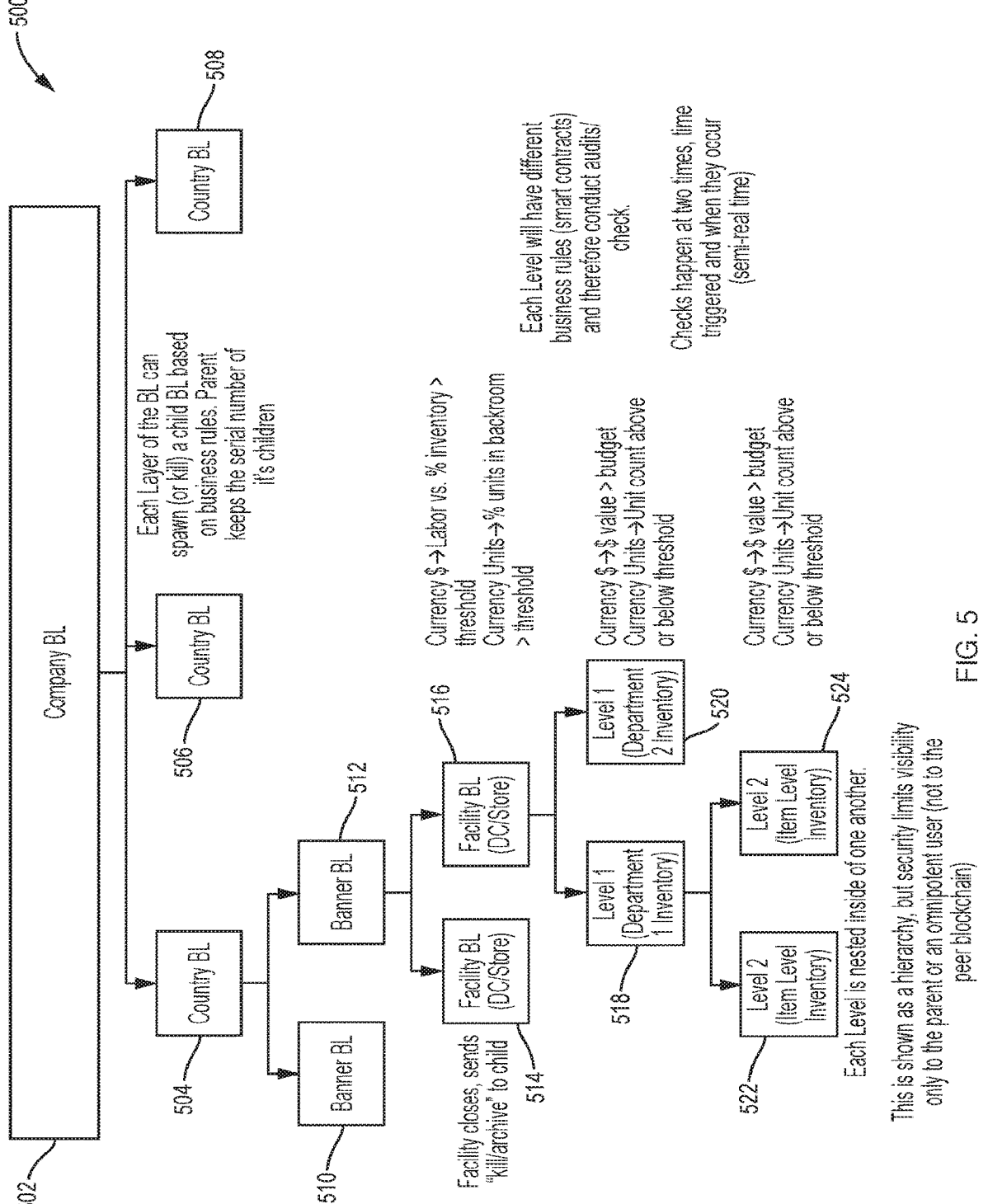
FIG. 5 is a block diagram illustrating components of a multiple blockchain system in accordance with an exemplary embodiment.

FIG. 5 is a block diagram illustrating components of a multiple blockchain system in accordance with an exemplary embodiment. The multiple blockchain system 500 can include multiple layers of blockchains. Each blockchain can include a cryptographically verifiable ledger represented by a sequence of blocks. Each block can contain one or more transactions records and each subsequent block can contain a hash value associated with the previous block. Each blockchain can have a parent/child and/or sibling relationship with another blockchain. The first block in the child blockchain can include a hash value to a block in the parent blockchain. The parent blockchains can spawn and purge children blockchains.

The multiple blockchain system 500 can include a master blockchain 502 and sub-blockchains 504-524. The master blockchain 502 can be included in a central computing system (not shown in FIG. 5) and the sub-blockchains 504-524 can be included in sub-computing systems (not shown in FIG. 5). The central computing system and the sub-computing systems can include one or more servers, one or more computing devices, one or more processing device, and/or one or more nodes in a distributed network, to control the operations of the master and sub-blockchains. The master blockchain 502 may not have an associated parent blockchain. The multiple blockchain system 500 can further include sub-blockchains 504-508. The master blockchain and sub-blockchains 504-508 can have a direct parent-child relationship. The master blockchain 504-508 can spawn the sub-blockchains 504-508 in response to receiving an event.

The multiple blockchain system 500 can have further sub-blockchains 510-512 with a direct parent-child relationship with sub-blockchain 504. The multiple blockchain system 500 can have further sub-blockchains 514-516 with a direct parent-child relationship with sub-blockchain 512. The multiple blockchain system 500 can have further sub-blockchains 518-520 with a direct parent-child relationship with sub-blockchain 516. The multiple blockchain system 500 can have further sub-blockchains 522-524 with a direct parent-child relationship with sub-blockchain 518.

As described above, the master blockchain can receive an event including transaction records. The central computing system can identify one or more of the sub-blockchains 504-508 affected by the event. The central computing system can transmit the event including the transaction records to one or more of the sub-computing systems including the sub-blockchains 504-508 affected by the event. In one embodiment, the central computing system can spawn the one of the sub-blockchains 504-508 in the sub-computing systems, prior to transmitting the event and the transaction records. As an example, the central computing system can transmit the event and transaction records to the sub-computing system and trigger a new block to be generated in the cryptographically verifiable ledger associated with the sub-blockchain 504. The new block can include the transaction records from the event.

The sub-computing system of the sub-blockchain 504 can identify sub-computing systems of the sub-blockchains 510-512 are affected by the event. The sub-computing system of the sub-blockchain 504 can transmit the event and transaction records to the sub-computing systems of the sub-blockchain 510 and sub-blockchain 512 and trigger a new block to be generated in the cryptographically verifiable ledger associated with the sub-blockchain 510 and sub-blockchain 512. The new block can include the transaction records from the event.

The sub-computing system of the sub-blockchain 512 can identify sub-computing systems of the sub-blockchains 514-516 are affected by the event. The sub-computing system of the sub-blockchain 512 can transmit the event and transaction records to the sub-computing systems of the sub-blockchain 514 and sub-blockchain 516 and trigger a new block to be generated in the cryptographically verifiable ledger associated with the sub-blockchain 514 and sub-blockchain 516. The new block can include the transaction records from the event.

The sub-computing system of the sub-blockchain 516 can identify sub-computing systems of the sub-blockchains 518-520 are affected by the event. The sub-computing system of the sub-blockchain 516 can transmit the event and transaction records to the sub-computing systems of the sub-blockchain 518 and sub-blockchain 520 and trigger a new block to be generated in the cryptographically verifiable ledger associated with the sub-blockchain 518 and sub-blockchain 520. The new block can include the transaction records from the event.

The sub-computing system of the sub-blockchain 518 can identify sub-computing systems of the sub-blockchains 522-524 are affected by the event. The sub-computing system of the sub-blockchain 518 can transmit the event and transaction records to the sub-computing systems of the sub-blockchain 522 and sub-blockchain 524 and trigger a new block to be generated in the cryptographically verifiable ledger associated with the sub-blockchain 522 and sub-blockchain 524. The new block can include the transaction records from the event.

Each blockchain can store different types of data values. The parent blockchains can identify the type of data values stored in the child blockchains. The parent blockchains can convert the type of data value stored in the parent blockchain to a type of data value stored in the child blockchain for the transaction records associated with the event. The types of data values can be one or more of, monetary currency, labor costs, inventory costs, and/or temporal costs.

As described above, the parent blockchain can purge a child blockchain based on an event satisfying threshold requirements (i.e., as set forth in a smart contract). As an example, the sub-blockchain 512 can purge and/or archive sub-blockchain 514 based on a received event.

Figure 6:
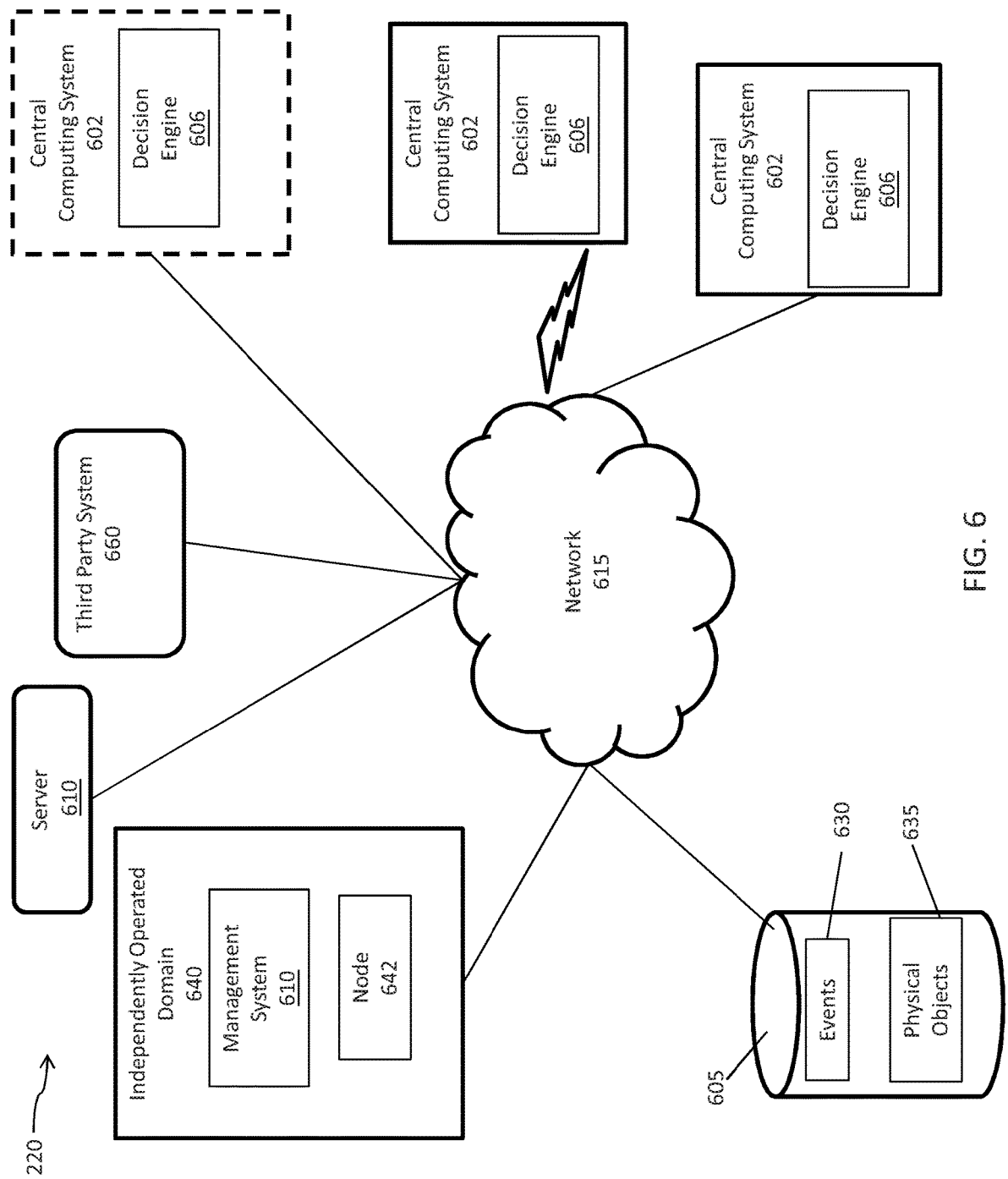
FIG. 6 illustrates an exemplary network diagram of the exception handling system in accordance with an exemplary embodiment.

FIG. 6 illustrates an exemplary network diagram of an embodiment of the nested blockchain system 250 in accordance with an exemplary embodiment. In the present example embodiment, the nested blockchain system 250 can include one or more data storage devices 605, one or more central computing systems 602, one or more sub nodes 642, and one or more third party systems 660. The central computing system 602 can be in communication with the data storage devices 605, the independently operated domains 640 and third party systems 660, via a communications network 615. The central computing system 602 can execute at least one instance of a decision engine 606. The decision engine 606 can be an application configured to implement the nested blockchain system 250, described herein. The central computing system can include a node 640. The node 640 can store a copy of a master blockchain record and/or a shared ledger storing data associated events of data. The master blockchain can be embodied as a master cryptographically verifiable ledger represented by a sequence of blocks, each block containing one or more transactions records and each subsequent block containing a hash value associated with the previous block.

The sub node 642 can store a copy of a sub blockchain record and/or a shared ledger storing data associated events of data. The blockchain can be embodied as sub cryptographically verifiable ledger represented by a sequence of blocks, each block containing one or more transactions records and each subsequent block containing a hash value associated with the previous block.

The master cryptographically verifiable ledger and the sub cryptographically verifiable ledgers can have a parent-child relationship. The master cryptographically verifiable ledgers can control the addition and subtraction of blocks in the sub cryptographically verifiable ledgers. Additionally, the master cryptographically verifiable ledger can purge and/or spawn multiple sub cryptographically verifiable ledgers. It also can be appreciated that sub cryptographically verifiable ledgers can spawn further sub cryptographically verifiable ledgers. The sub cryptographically verifiable ledgers can have parent-child relationships with the further sub cryptographically verifiable ledgers. The sub cryptographically verifiable ledgers can control the addition and subtraction of blocks in the further sub cryptographically verifiable ledgers. Additionally the sub cryptographically verifiable ledgers can purge the further sub cryptographically verifiable ledgers.

In an example embodiment, one or more portions of the communications network 615 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The central computing system 602 includes one or more computers or processors configured to communicate with the data storage devices 605, and the sub nodes 642. The data storage devices 605 can store information/data, as described herein. For example, the data storage devices 605 can include an events database 630, and a physical objects database 635. The events database 630 can be embodied relational database configured to store information associated with event. As a non-limiting example, the event database 630 can store transaction records associated with physical objects such as invoices, purchase orders, inventory records, sales/returns records, vendor orders, claims, shipping orders, and/or receiving orders. The physical objects database 635 can store information associated with physical objects disposed at a facility. The data storage devices 605 and the central computing system 602 can be located at one or more geographically distributed locations from each other. Alternatively, the data storage devices 605 can be included within the central computing system 602.

In an exemplary embodiment, the central computing system 602 can receive a first event including transaction records associated with a physical object, from a third party system 660. The central computing system 602 can execute the decision engine 606 in response to receiving the first event. The decision engine 606 can query the physical objects database 635 to verify the first event. The decision engine 606 can instruct the node 640 to generate a block in the master cryptographically verifiable ledger for a first event in response to receipt of the first event from the third party system. The node 640 can generate the block including records associated with the first event in the master cryptographically verifiable ledger.

The decision engine 606 can instruct the node 640 to execute code stored in the master cryptographically verifiable ledger to verify that the first event corresponds with a first set of one or more conditions. As an example, the conditions can be associated with the date and/or time of the event, the location the event occurred, the type of event and/or other details related to the event. The code can be associated with the initiation of a smart contract. In response to verification of the first event, the decision engine 606 can instruct the node 606 to spawn a first sub cryptographically verifiable ledger represented by a first genesis block containing a hash value referencing the block generated in the master cryptographically verifiable ledger. The node 640 can generate the first sub cryptographically verifiable ledger including a block including a hash value of the block created in the master cryptographically verifiable ledger, including the transaction records of the first event. The block generated in the first sub cryptographically verifiable ledger can also include the transaction records of the event. The first sub cryptographically verifiable ledger can be represented by the sub node 642.

The central computing system 602 can receive a second event from the third party system 660. The decision engine 606 can query the physical objects database 635 to verify the second event is associated to the first event. The decision engine 606 can trigger the generation of the new block in the first sub cryptographically verifiable ledger associated with the second event. The node 640 can generate a new block in the first sub cryptographically verifiable ledger including transaction records associated with the second event. The decision engine 606 can execute code included in the block of the first sub cryptographically verifiable ledger containing transaction records associated with the first event, to verify the second event corresponds with one or more conditions. The code can be associated with the completion of the smart contract. In response to the verification of the second event the decision engine 606 can purge the first sub cryptographically verifiable ledger. In one embodiment, the decision engine 606 can archive the first sub cryptographically verifiable ledger.

The central computing system 602 can receive a third event. The decision engine 606 can query the physical objects database 630 to verify the third event. The decision engine 606 can trigger the generation a new block to be generated in the master cryptographically verifiable ledger containing transaction records of the third event. The node 640 can generate the new block in the master cryptographically verifiable ledger including the transaction records of the third event. The decision engine 606 can execute code included in the newly generated block to verify the third event corresponds with a third set of one or more conditions. In response to verification of the third event, the decision engine 606 can spawn a second sub cryptographically verifiable ledger represented by a genesis block containing a hash value associated with the newly generated block generated in the master cryptographically verifiable ledger, associated with the third event. The sub node 642 can represent the second sub cryptographically verifiable ledger.

The central computing system 602 can receive a fourth event. The decision engine 606 can query the physical objects database 630 to verify the fourth event. The decision engine 606 can trigger the generation a new block to be generated in the second sub cryptographically verifiable ledger containing transaction records of the fourth event. The sub node 642 can generate the new block in the second sub cryptographically verifiable ledger including the transaction records of the fourth event. The decision engine 606 can trigger the node 640 to purge the second sub cryptographically verifiable ledger after a specified amount of time after receiving the fourth event.

As an example, the first event can be associated with the request of a delivery of a physical object and the second event can be associated with the completion of the delivery of the physical object. The transaction records of the first, second, third, or fourth include one or more of a quantity of the at least one physical object, a name of the at least one physical object, a type of the at least one physical object and a size of the at least one physical object.

In one embodiment, the third party system 660 is one or more of a: mobile device, a terminal or a computing device. The terminal can be a system disposed in a facility. Additionally, the decision engine 606 can archive each received event in the events database 630. As described above, the events database 630 can be a relational database.

As a non-limiting example, nested blockchain system 250 can be implemented as in a retail store and/or e-commerce website. For example, the sub cryptographically verifiable ledgers can be storing and processing inventory, sales, purchase orders, or retail store stock rooms. The physical objects can be embodied as products sold at the retail store and/or e-commerce website. The third party system 660 can be a mobile/computing device executing an application associated with the retail store/e-commerce website, or a Point of Sale (POS) terminal.

In one example, the first event can be associated with a purchase of a product. The decision engine 606 can query the physical objects database 635 to verify the purchase. The node 640 can generate the block including transaction records associated with the purchase in the master cryptographically verifiable ledger. The decision engine 606 can instruct the node 640 to execute code stored in the master cryptographically verifiable ledger to verify that the purchase requires a delivery of the purchased products. In response to verification of the first event, the decision engine 606 can instruct the node 640 to spawn a first sub cryptographically verifiable ledger represented by a genesis block containing a hash value referencing the block generated in the master cryptographically verifiable ledger. The node 640 can generate the first sub cryptographically verifiable ledger including a block including a hash value of the block created in the master cryptographically verifiable ledger, including the transaction records of the purchase of the product and the initiation of the delivery of the product.

The central computing system 602 can receive a second event from the third party system 660. As an example, the second event can be the completion of the delivery of the product. The decision engine 606 can query the physical objects database 635 to verify the second event is associated to the first event. The decision engine 606 can trigger the generation of the new block in the first sub cryptographically verifiable ledger associated with the second event. The node 640 can generate a new block in the first sub cryptographically verifiable ledger including transaction records associated with the completion of the delivery. The decision engine 606 can execute code included in the block of the first sub cryptographically verifiable ledger containing transaction records associated with the first event, to verify the second event corresponds with one or more conditions. The conditions can be associated with the completion time, date, and location of the delivery of the product.

Figures 7, 8:
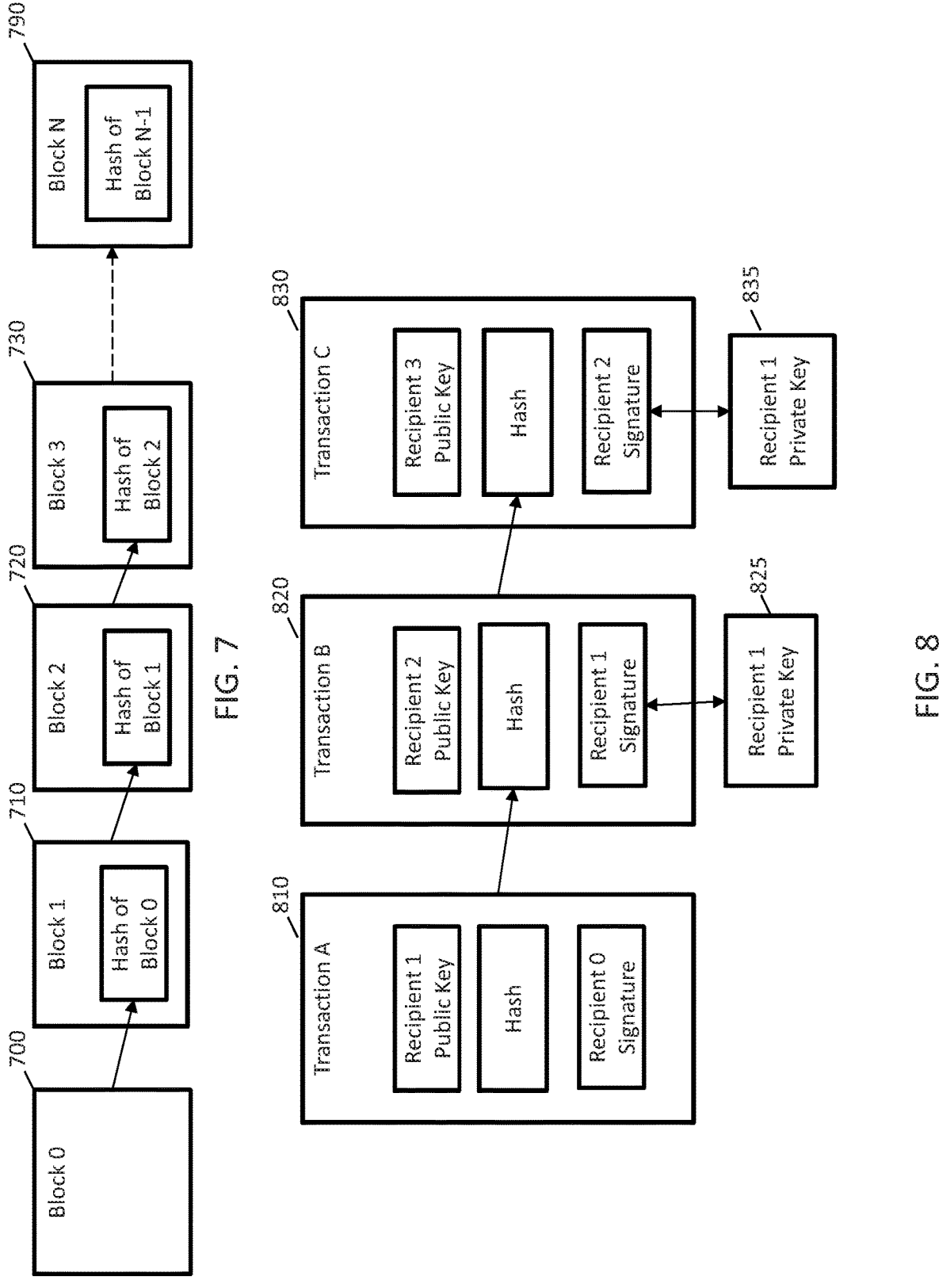
FIG. 7 depicts an illustration of blocks as configured in accordance with an exemplary embodiment.
FIG. 8 depicts an illustration of transactions configured in accordance with an exemplary embodiment.
Figure 9:
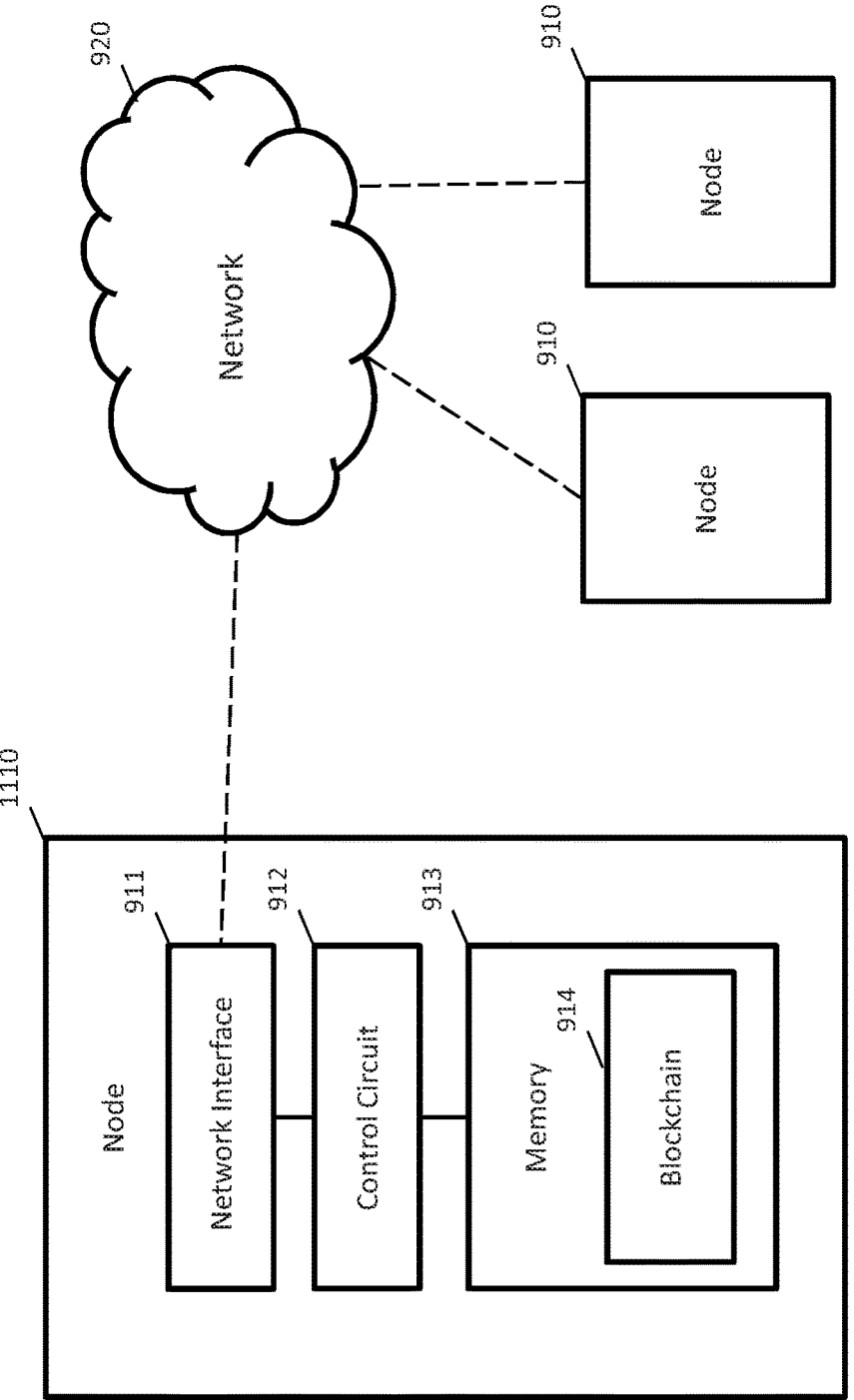
FIG. 9 depicts a system diagram configured in accordance with an exemplary embodiment.

Descriptions of some embodiments of blockchain technology are provided with reference to FIGS. 7-9 herein. In some embodiments, blockchain technology may be utilized for exception handling in a distributed system as described herein. One or more of the independently operated domains as described herein may comprise a node in a distributed blockchain system storing a copy of the blockchain record. Updates to the blockchain may comprise information associated with events associated with physical objects received by the independently operated domains, and one or more nodes on the system may be configured to incorporate one or more events into blocks to add to the distributed database.

Distributed database and shared ledger database generally refer to methods of peer-to-peer record keeping and authentication in which records are kept at multiple nodes in the peer-to-peer network instead of being kept at a trusted party. However, exemplary embodiments of the present disclosure can also utilize a private (trusted) system to maintain the blockchains. A blockchain may generally refer to a distributed database that maintains a growing and ordered list or chain of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, the exception handling system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, e.g., resulting from in-field authentication of autonomous electronic devices, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Now referring to FIG. 7, an illustration of a blockchain according to embodiments of the present disclosure is shown. As mentioned in above, with reference to FIG. 6, a blockchain comprises a hash chain or a hash tree in which each block added in the chain contains a hash of the previous block. In FIG. 7, block 0 700 represents a genesis block of the chain and can be generated in response to an event received associated with one or more physical objects. The block 0 700 can include information associated with the event associated with the physical objects and a hash key and a timestamp. The information associated with the event received associated with one or more physical objects can include information associated with the physical objects and information associated with the event, such as the delivery of the physical object, a quantity of the at least one physical object, name of the at least one physical object, type of the at least one physical object and size of the at least one physical object, and/or transfer of the ownership of physical objects. Block 1 710 can be generated in response to a verification of the event. The block 1 710 can contain a hash of block 0 700. The block 1 710 can include the information associated with the event and the physical objects. Otherwise, the block 1 710 can include information that an event was not verified. Additional blocks can be generated as additional requests are received and each block that is generated can include a hash of a previous block. For example, block 2 720 can be generated in response to a subsequent request and can contain a hash of block 1 710, block 3 730 can be generated in response to a yet another subsequent request and can contain a hash of block 2 720, and so forth. Continuing down the chain, block N contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, the blocks generated by a computing system can contain rules and data for authorizing different types of actions and/or parties who can take action as described herein. In some embodiments, transaction and block forming rules may be part of the software algorithm on each node. When a new block is being formed, any node on the system can use the prior records in the blockchain to verify whether the requested action is authorized. For example, a block may contain a public key associated with the user of a user device that purchased/acquired the physical object, this design that allows the user to show possession and/or transfer the digital license using a private key. Nodes may verify that the user is in possession of the one or more physical objects and/or is authorized to transfer the one or more physical objects based on prior events when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. Nodes can compete to provide proof-of-work to form a new block, and the first successful node of a new block earns a reward.

Now referring to FIG. 8, an illustration of blockchain-based transactions according to some embodiments is shown. In some embodiments, the blockchain illustrated in FIG. 8 comprises a hash chain protected by private/public key encryption. Transaction A 810 represents an event in a block of a blockchain showing that recipient 1(e.g., a node creating a new block with transaction records associated with physical objects, based on a received event). Transaction A 810 contains recipient's 1 public key and recipient 0's signature for the transaction and a hash of a previous block. When recipient 1, central computing system transmits an alert including the public key and private key, to an independently operated domain, of the newly generated block storing the transaction records, in a different independently operated domain, and the independently operated domain accesses the transaction record, a block containing transaction B 820 is formed. The record of transaction B 820 comprises the public key of recipient 2, a hash of the previous block, and recipient 1's signature for the transaction that is signed with the recipient 1's private key 825 and verified using recipient 1's public key in transaction A 810. If recipient 2 (e.g., the node) transmits an alert including the public key and private key, to an independently operated domain, of the newly generated block storing the transaction records to recipient 3 (e.g., a different node), a block containing transaction C 830 is formed. The record of transaction C 830 comprises the public key of recipient 3, a hash of the previous block, and recipient 2's signature for the transaction that is signed by recipient 2's private key 835 and verified using recipient 2's public key from transaction B 820.

In some embodiments, when each event is created, the system may check previous events and the current recipient's private and public key signature to determine whether the transaction is valid. In some embodiments, transactions are broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date event to prevent the current recipient from double spending the asset. The transactions in FIG. 8 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Now referring to FIG. 9, a system according to some embodiments is shown. The exception handling system comprises a plurality of nodes 910 communicating over a network 920. In some embodiments, the nodes 910 may comprise a distributed blockchain server and/or a distributed timestamp server. Each node 910 in the system comprises a network interface 911, a control circuit 912, and a memory 913.

The control circuit 912 may comprise a processor, a microprocessor, and the like and may be configured to execute computer-readable instructions stored on a computer-readable storage memory 913. The computer-readable storage memory may comprise volatile and/or non-volatile memory and have stored upon it a set of computer-readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 7-9 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown, once a block is formed, the block cannot be changed without redoing the work to satisfy census rules thereby securing the block from tampering. A malicious attacker would need to provide proof standard for each block subsequent to the one he/she seeks to modify, race all other nodes and overtake the majority of the system to affect change to an earlier record in the blockchain.

Figure 10:
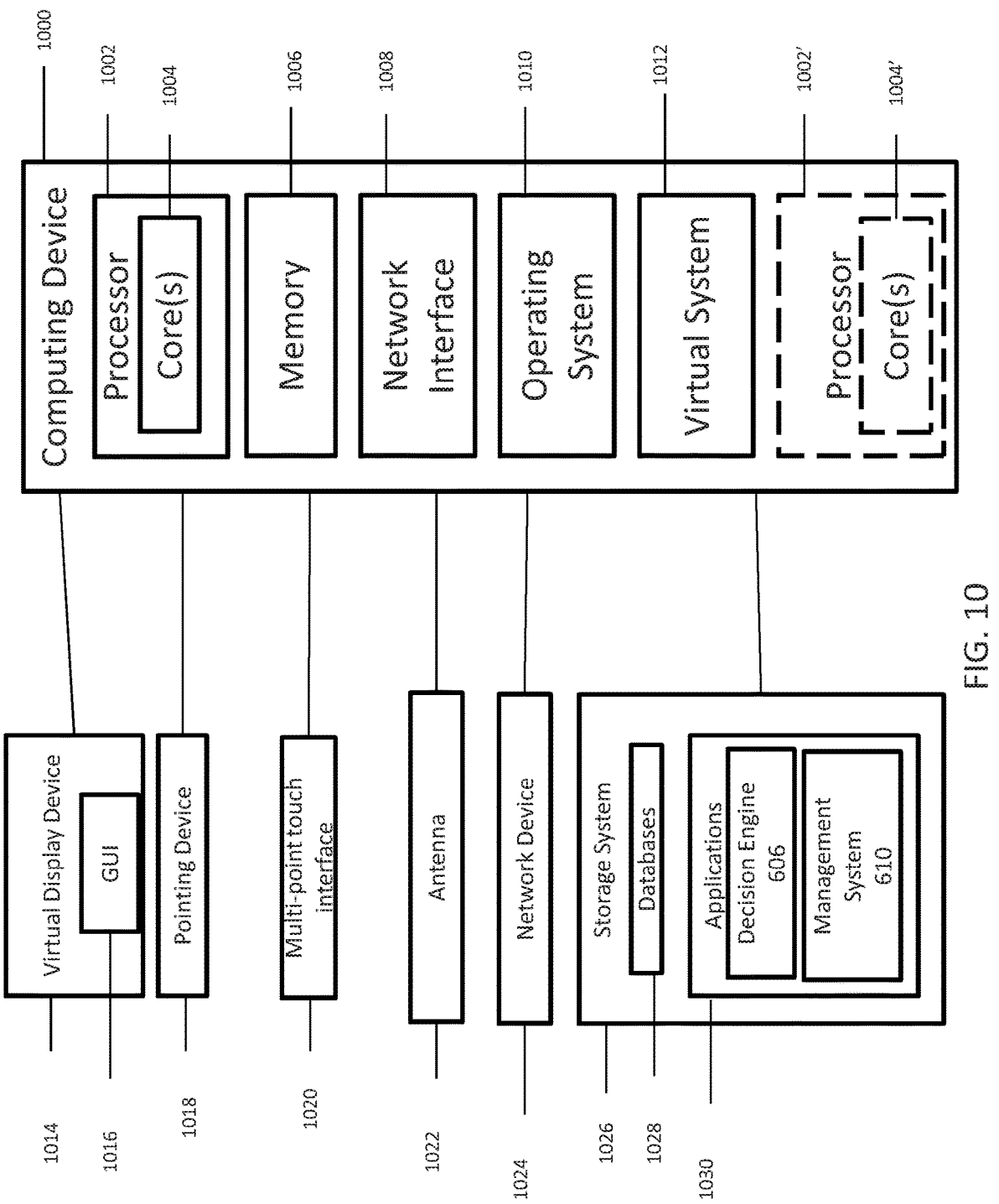
FIG. 10 depicts a block diagram of an exemplary computing device in accordance with an exemplary embodiment.

FIG. 10 is a block diagram of an example computing device for implementing exemplary embodiments of the present disclosure. Embodiments of the computing device 1000 can implement embodiments of the system for resolving data discrepancies. For example, the computing device can be embodied as a portion of the central computing system, and/or a third party system. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1006 included in the computing device 1000 may store computer-readable and computer-executable instructions or software (e.g., applications 1030 such as the decision engine 606) for implementing exemplary operations of the computing device 1000. The computing device 1000 also includes configurable and/or programmable processor 1002 and associated core(s) 1004 and, optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for implementing exemplary embodiments of the present disclosure. Processor 1002 and processor(s) 1002' may each be a single core processor or multiple core (1004 and 1004') processor. Either or both of processor 1002 and processor(s) 1002' may be configured to execute one or more of the instructions described in connection with computing device 1000.

Virtualization may be employed in the computing device 1000 so that infrastructure and resources in the computing device 1000 may be shared dynamically. A virtual machine 1012 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof. A user may interact with the computing device 1000 through a visual display device 1014, such as a computer monitor, which may display one or more graphical user interfaces 1016, multi touch interface 1020 and a pointing device 1018.

The computing device 1000 may also include one or more storage devices 1026, such as a hard-drive, CD-ROM, or other computer-readable media, for storing data and computer-readable instructions and/or software that implement exemplary embodiments of the present disclosure (e.g., applications such as the decision engine 606). For example, exemplary storage device 1026 can include one or more databases 1028 for storing information associated with physical objects and events associated with the physical objects. The databases 1028 may be updated manually or automatically at any suitable time to add, delete, and/or update one or more data items in the databases.

The computing device 1000 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the central computing system can include one or more antennas 1022 to facilitate wireless communication (e.g., via the network interface) between the computing device 1000 and a network and/or between the computing device 1000 and other computing devices. The network interface 1008 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1010, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 1000 and performing the operations described herein. In exemplary embodiments, the operating system 1010 may be run in native mode or emulated mode. In an exemplary embodiment, the operating system 1010 may be run on one or more cloud machine instances.

FIG. 11 is a flowchart illustrating an exemplary process of an embodiment of a nested blockchain system in accordance with the present disclosure. The nested blockchain system can include distributed nodes in a network. In operation 1100, a node is configured to generate a master cryptographically verifiable distributed ledger represented by a sequence of blocks. Each block contains one or more transactions records and each subsequent block containing a hash value associated with the previous block. In operation 1102, the node generates a first block in the master cryptographically verifiable ledger for a first event in response to receipt of the first event from a third party system. In operation 1104, the node executes code included in an associated block of the master cryptographically verifiable ledger to verify that the first event corresponds with a first set of one or more conditions. In operation 1106, in response to verification of the first event, the node spawns a first sub cryptographically verifiable ledger represented by a first genesis block containing a hash value referencing the first block generated in the master cryptographically verifiable ledger. In operation 1108 the node generates a second block in the first sub cryptographically verifiable ledger for a second event in response to receipt of a second event from the third party system. In operation 1110, the node executes code included in the first genesis block to verify that the second event corresponds with a second set of one or more conditions. In operation 1112, in response to the verification of the second event, the node purges the first sub cryptographically verifiable ledger.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A distributed database management system, the system comprising:
   a node of a plurality of distributed nodes in a network, the node configured to:
   receive a master cryptographically verifiable distributed ledger that will be represented by a sequence of blocks, each block to contain one or more transactions records and each subsequent block to contain a hash value associated with the previous block;
   receive a first block in the master cryptographically verifiable ledger for a first event;
   in response to the first event, spawn a first sub cryptographically verifiable ledger represented by a first genesis block containing a hash value referencing the first block generated in the master cryptographically verifiable ledger;
   receive a second block in the first sub cryptographically verifiable ledger for a second event; and
   in response to the second event, purge the first sub cryptographically verifiable ledger.

2. The system of claim 1, wherein the node is programmed to receive a third event.

3. The system of claim 2, wherein the node is programmed to:
   receive a third block in the master cryptographically verifiable ledger containing transaction records of the third event; and
   spawn a second sub cryptographically verifiable ledger represented by a second genesis block containing a hash value associated with the third block generated in the master cryptographically verifiable ledger and associated with the third event.

4. The system of claim 3, wherein the node is programmed to receive a fourth event.

5. The system of claim 4, wherein the node is programmed to receive a fourth block in the second sub cryptographically verifiable ledger containing transaction records associated with the fourth event.

6. The system of claim 5, wherein the node is programmed to purge the second sub cryptographically verifiable ledger after a specified amount of time after receiving the fourth event.

7. The system of claim 1, wherein the first event is associated with a request of a delivery of a physical object and the second event is associated with a completion of the delivery of the physical object.

8. The system of claim 7, wherein the one or more transaction records include one or more of a quantity of the physical object, a name of the physical object, a type of the physical object and a size of the physical object.

9. The system of claim 1, wherein:

the first block is generated for the first event in response to receipt of the first event at a third party system;

the second block is generated for the second event in response to receipt of the second event at the third party system; and the third party system is one or more of a mobile device, a terminal, or a computing device.

10. The system of claim 9, wherein the terminal is disposed in a facility.

11. A distributed database management method, the method comprising:

receiving, at a node of a plurality of distributed nodes in a network, a master cryptographically verifiable distributed ledger that will be represented by a sequence of blocks, each block to contain one or more transactions records and each subsequent block to contain a hash value associated with the previous block;

receiving, at the node of the plurality of nodes, a first block in the master cryptographically verifiable ledger for a first event;

in response to the first event, spawn, via the node of the plurality of nodes, a first sub cryptographically verifiable ledger represented by a first genesis block containing a hash value referencing the first block generated in the master cryptographically verifiable ledger;

receiving, at the node of the plurality of nodes, a second block in the first sub cryptographically verifiable ledger for a second event; and in response to the second event, purging, via the node of the plurality of nodes, the first sub cryptographically verifiable ledger.

12. The method of claim 11, further comprising receiving, via the node of the plurality of nodes, a third event.

13. The method of claim 12, further comprising:

receiving, via the node of the plurality of nodes, a third block in the master cryptographically verifiable ledger containing transaction records of the third event; and spawning, via the node of the plurality of nodes, a second sub cryptographically verifiable ledger represented by a second genesis block containing a hash value associated with the third block generated in the master cryptographically verifiable ledger and associated with the third event.

14. The method of claim 13, further comprising receiving, via the node of the plurality of nodes, a fourth event.

15. The method of claim 14, further comprising receiving, via the node of the plurality of nodes, a fourth block in the second sub cryptographically verifiable ledger containing transaction records associated with the fourth event.

16. The method of claim 15, purging, via the node of the plurality of nodes, the second sub cryptographically verifiable ledger after a specified amount of time after receiving the fourth event.

17. The method of claim 11, wherein the first event is associated with a request of a delivery of a physical object and the second event is associated with a completion of the delivery of the physical object.

18. The method of claim 17, wherein the one or more transaction records include one or more of a quantity of the physical object, a name of the physical object, a type of the physical object and a size of the physical object.

19. The method of claim 11, wherein:

the first block is generated for the first event in response to receipt of the first event at a third party system;

the second block is generated for the second event in response to receipt of the second event at the third party system; and the third party system is one or more of a mobile device, a terminal, or a computing device.

20. The method of claim 19, wherein the terminal is disposed in a facility.

\* \* \* \* \*